US011175301B2

(12) United States Patent
Mori et al.

(10) Patent No.: US 11,175,301 B2
(45) Date of Patent: Nov. 16, 2021

(54) AUTOMATIC ANALYZER AND REAGENT BOTTLE LOADING METHOD

(71) Applicants: HITACHI HIGH-TECHNOLOGIES CORPORATION, Tokyo (JP); ROCHE DIAGNOSTICS OPERATIONS, INC., Indianapolis, IN (US)

(72) Inventors: Takamichi Mori, Tokyo (JP); Kouhei Nonaka, Tokyo (JP); Masaki Hara, Tokyo (JP); Masato Ishizawa, Tokyo (JP); Hitoshi Tokieda, Tokyo (JP); Stephan Sattler, Starnberg (DE)

(73) Assignees: HITACHI HIGH-TECH CORPORATION, Tokyo (JP); ROCHE DIAGNOSTICS OPERATIONS, INC., Indianapolis, IN (US)

( * ) Notice: Subject to any disclaimer, the term of this patent is extended or adjusted under 35 U.S.C. 154(b) by 200 days.

(21) Appl. No.: 15/752,616

(22) PCT Filed: Aug. 23, 2016

(86) PCT No.: PCT/JP2016/074462
§ 371 (c)(1),
(2) Date: Feb. 14, 2018

(87) PCT Pub. No.: WO2017/038546
PCT Pub. Date: Mar. 9, 2017

(65) Prior Publication Data
US 2018/0246132 A1    Aug. 30, 2018

(30) Foreign Application Priority Data
Aug. 28, 2015    (JP) .............................. JP2015-168643

(51) Int. Cl.
*G01N 35/10*  (2006.01)
*G01N 35/00*  (2006.01)
*G01N 35/04*  (2006.01)

(52) U.S. Cl.
CPC ......... *G01N 35/1002* (2013.01); *G01N 35/00* (2013.01); *G01N 35/0092* (2013.01);
(Continued)

(58) Field of Classification Search
None
See application file for complete search history.

(56) References Cited

U.S. PATENT DOCUMENTS

2005/0013735 A1    1/2005    Gebrian et al.
2005/0207938 A1    9/2005    Hanawa et al.
(Continued)

FOREIGN PATENT DOCUMENTS

JP    2005-037171 A    2/2005
JP    2007-524082 A    8/2007
(Continued)

OTHER PUBLICATIONS

Machine-generated English translation of JP2008-020361, published Jan. 31, 2008.*
(Continued)

*Primary Examiner* — Kathryn Wright
(74) *Attorney, Agent, or Firm* — Mattingly & Malur, PC

(57) ABSTRACT

An automatic analyzer includes: a reagent mounting unit 103 in which a plurality of reagent bottles 10 are installed when a reagent bottle 10 is loaded into the automatic analyzer; a reagent conveying mechanism 101 including a gripper mechanism 106; and a reagent mounting mechanism 102 for moving the reagent mounting unit 103 between an installation position at which an operator installs the reagent bottle 10 in the reagent mounting unit 103 and a position at
(Continued)

which the gripper mechanism 106 grips the reagent bottle 10. It is thereby possible to achieve saving of a mechanism installation space and reduction of the number of constituent components, automatically carry out an operation from opening of the reagent bottle to loading of the reagent bottle into the reagent disk, and alleviate an operator's burden.

21 Claims, 30 Drawing Sheets

(52) U.S. Cl.
CPC ....... *G01N 35/00732* (2013.01); *G01N 35/04* (2013.01); *G01N 2035/0094* (2013.01); *G01N 2035/00673* (2013.01); *G01N 2035/0405* (2013.01); *G01N 2035/0443* (2013.01); *G01N 2035/0465* (2013.01)

(56) References Cited

U.S. PATENT DOCUMENTS

| | | |
|---|---|---|
| 2008/0199358 A1 | 8/2008 | Yamano |
| 2011/0223682 A1 | 9/2011 | Wakamiya |
| 2012/0251389 A1 | 10/2012 | Akutsu |
| 2012/0301359 A1 | 11/2012 | Kraemer et al. |
| 2014/0295562 A1* | 10/2014 | Wakamiya .............. G01N 35/04 436/48 |
| 2016/0161521 A1* | 6/2016 | Sakairi ............... G01N 35/1002 422/67 |

FOREIGN PATENT DOCUMENTS

| | | |
|---|---|---|
| JP | 2008-020361 A | 1/2008 |
| JP | 2008-203004 A | 9/2008 |
| JP | 2010-085249 A | 4/2010 |
| JP | 2011-027663 A | 2/2011 |
| JP | 2011-191062 A | 9/2011 |
| WO | 2011/074202 A1 | 6/2011 |
| WO | WO-2015025616 A1 * | 2/2015 |

OTHER PUBLICATIONS

International Search Report of PCT/JP2016/074462 dated Nov. 1, 2016.
International Preliminary Report on Patentability received in corresponding International Application No. PCT/JP2016/074462 dated Mar. 15, 2018.

* cited by examiner

AUTOMATIC ANALYZER AND REAGENT BOTTLE LOADING METHOD

TECHNICAL FIELD

The present invention relates to an automatic analyzer for analyzing a concentration and the like of a predetermined component in a liquid sample such as blood or urine and a method of loading a reagent bottle into the automatic analyzer, and particularly relates to an automatic analyzer for automatically loading and unloading a reagent used in analysis and a method of loading a reagent bottle into the automatic analyzer.

BACKGROUND ART

As exemplary automatic analyzer that inhibits reagent deficiency from occurring during analysis to minimize analysis interruption, reducing the burden on an operator due to operations, such as reagent registration and reagent replacement, PTL 1 describes an automatic analyzer including: pairs of reagent containers provided in a line in a replenishing reagent storage cabinet including a replenishing second reagent storage unit above a reagent disk, the replenishing reagent storage cabinet being capable of being equipped with a plurality of reagent containers; a rail arranged on the replenishing reagent storage cabinet; and a reagent retaining unit and a reagent lid opening unit provided on the rail, the reagent retaining unit and the reagent lid opening unit being movable together with the rail in a triaxial direction.

Furthermore, as an example of an automatic analyzer capable of eliminating manual unloading work and storage work of a reaction container from/in a reagent storage section and alleviating an operator's burden, Patent Document 2 describes an automatic analyzer for analyzing an analyte by reacting a sample with a reagent dispensed from a reagent container and measuring properties of a reaction liquid, wherein a conveying apparatus provided with a grasping transport section having a grasping apparatus that grasps the reagent container and a lifting member that supports the grasping apparatus to be movable in a predetermined direction and that is vertically movable, a transfer section having a container support table that supports a plurality of reagent containers and a guide that guides the container support table to be transferred between a neighborhood of a reagent storage and a disposal position, and a transport control section controlling the grasping transport section and the transfer section to be actuated is provided, and the conveying apparatus conveys the reagent container by means of the grasping transport section and the transfer section between the reagent storage and the disposal position and unloads and stores the reaction container from/in the reagent storage.

PRIOR ART DOCUMENTS

Patent Documents

Patent Document 1: JP-2005-037171-A
Patent Document 2: JP-2008-020361-A

SUMMARY OF THE INVENTION

Problem to be Solved by the Invention

For example, an automatic analyzer such as an automatic biochemical analyzer and an automatic immunoanalyzer needs to install therein a reagent in response to a measurement item of a patient analyte. Generally, for this installation of the reagent in a reagent bottle within the analyzer, an operator manually installs the reagent bottle in a reagent disk.

Basically and normally, the operator replaces reagent bottles during standby during which the analyzer does not carry out measurements. For example, when a remaining amount of a reagent for a certain measurement item is small, such a method is adopted as to grasp the number of measurable times with the remaining amount of the reagent in advance before measurement of a patient analyte, and to additionally install a new reagent bottle for the same item in the reagent disk when the remaining amount is small.

The reason is as follows. During the measurement of the analyte, a new reagent bottle cannot be added or an empty reagent bottle cannot be removed since the analyzer is in action. Owing to this, in a case in which the remaining amount of the reagent becomes small and a reagent bottle is supplemented or the like during a measurement, it is necessary to wait until the analyzer is completed with the measurement and turns into a standby state. This disadvantageously causes occurrence of operator's standby time, deterioration in workability, and occurrence of measurement time loss.

Furthermore, if the reagent bottle is in an opened state in which a reagent lid is removed, degradation of the reagent is accelerated. It is known that to prevent the degradation, a small incision is made in a lid of each reagent bottle and the reagent is dispensed from the incision using a reagent probe, whereby the reagent can be used in a stable state.

Boring a hole in the lid of each reagent bottle is carried out by causing the analyzer to automatically perform an operation from making a small incision in the lid of the reagent bottle until installing the reagent bottle in the reagent disk when the operator installs a plurality of reagent bottles in a reagent mounting mechanism within the analyzer.

In this case, there is a demand to install a certain number of reagent bottles altogether and continuously load the reagent bottles in the reagent disk since it takes time to install the reagent bottles if the operator sets the reagent bottles into the analyzer one by one and loads the reagent bottles into the reagent disk.

In the automatic analyzer described in Patent Document 1, if an operating range of a gripper mechanism that grips the reagent bottle is set in three directions (longitudinal, horizontal, and vertical directions) for loading the installed reagent bottle into the reagent disk, it is necessary to provide a structure that supports the gripper mechanism such that the structure supports four sides of the gripper mechanism like a scaffold. This increases the number of constituent components and makes the structure complicated. In other words, it is assumed that a configuration of the analyzer is complicated and failure risk and the like increase. Moreover, the opened reagent container is conveyed to a reagent mount port and mounted in the reagent disk by the reagent holding means. However, a short distance between the reagent mount port and the reagent probe possibly causes interference between a reagent dispensing probe and the gripper mechanism, which possibly and disadvantageously hampers smooth supply of the reagent to the reagent disk.

Furthermore, the reagent container conveying apparatus is disposed alongside a reagent cool box in the automatic analyzer described in Patent Document 2, which makes an analyzer large in space. Moreover, in a case in which the remaining amount of the reagent becomes small and the reagent bottle is supplemented or the like during a measurement, it is necessary to wait until the analyzer is completed with the measurement and turns into a standby state. The longer waiting time produces problems of increasing a temperature of the reagent bottle and degrading the reagent.

An object of the present invention is to provide an automatic analyzer and a reagent bottle loading method capable of achieving saving of a mechanism installation space and reduction of the number of constituent components, automatically loading a reagent bottle into a reagent disk, and thus alleviating an operator's burden.

Means for Solving the Problems

To solve the problems, the present invention adopts, for example, a configuration according to claims.

The present invention includes a plurality of means for solving the problem. As an example, an automatic analyzer configured to dispense a sample and a reagent to a reaction container to react the sample and the reagent, the automatic analyzer configured to measure a liquid that has reacted, the automatic analyzer including: a reagent disk configured to store a reagent bottle containing the reagent, the reagent disk including a reagent probe suction port accessed by a reagent probe when the reagent is dispensed in the reaction container and a loading port for loading the reagent bottle into the reagent disk; a reagent mounting unit configured to be provided with the plurality of the reagent bottles are installed when the reagent bottle is loaded into the automatic analyzer; a reagent conveying unit including a gripper unit configured to grip the reagent bottle for conveying the reagent bottle installed in the reagent mounting unit into the reagent disk; and a conveying line a horizontal position of which is present between the reagent probe suction port and the loading port, the conveying line being for moving the reagent mounting unit between an installation position at which an operator installs the reagent bottle in the reagent mounting unit and a position at which the gripper unit grips the reagent bottle.

Advantages of the Invention

According to the present invention, it is possible to achieve saving of a mechanism installation space and reduction of the number of constituent components, automatically load a reagent bottle into a reagent disk, and alleviate an operator's burden.

MODES FOR CARRYING OUT THE INVENTION

Embodiments of an automatic analyzer and a reagent bottle loading method according to the present invention will be described hereinafter with reference to the drawings.

First Embodiment

A first embodiment of an automatic analyzer and a reagent bottle loading method according to the present invention will be described with reference to FIGS. 1 to 28.

Figure 1:
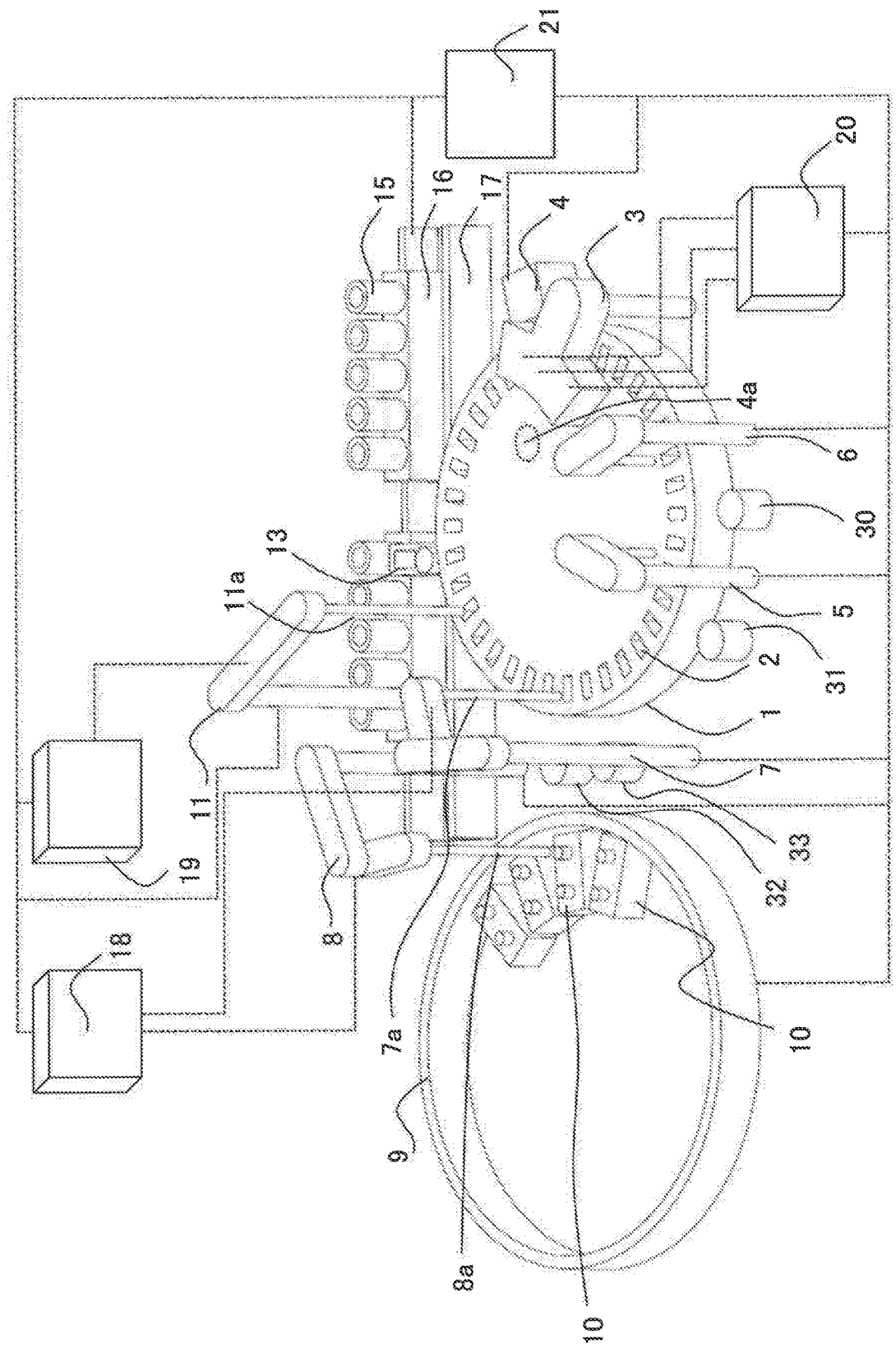
FIG. 1 is a schematic diagram of an overall configuration of an ordinary automatic analyzer.

FIG. 1 is a perspective view of the automatic analyzer according to the present embodiment.

In FIG. 1, the automatic analyzer is an apparatus that dispenses a sample and a reagent into each of a plurality of reaction containers 2 to cause a reaction and measures a liquid resulting from the reaction. The automatic analyzer includes a reaction disk 1, a reagent disk 9, a sample conveying mechanism 17, reagent dispensing mechanisms 7 and 8, a reagent syringe 18, a sample dispensing mechanism 11, a sample syringe 19, a cleaning mechanism 3, a light source 4a, a spectrophotometer 4, stirring mechanisms 5 and 6, a cleaning pump 20, cleaning tanks 13, 30, 31, 32 and 33, a controller 21, and an autoloader mechanism 100 (see FIG. 2).

Reaction containers 2 are arranged on a circumference of a circle of the reaction disk 1. The sample conveying mechanism 17 that moves a rack 16 mounting thereon sample containers 15 is installed near the reaction disk 1.

The sample dispensing mechanism 11 that is rotatable and vertically movable is installed between the reaction disk 1 and the sample conveying mechanism 17, and includes a sample probe 11a. The sample syringe 19 is connected to the sample probe 11a. The sample probe 11a moves while describing a circular arc about a rotational axis, and dispenses the sample into each reaction container 2 from one sample container 15.

The reagent disk 9 is a storage that can mount a plurality of reagent bottles 10 each containing therein the reagent on a circumference of a circle. The reaction disk 9 is kept cool, and covered with a cover that has a reagent probe suction port 111 (see FIG. 2) for each of reagent probes 7a and 8a of the reagent dispensing mechanisms 7 and 8 to access the reagent disk 9 when the reagent is dispensed into each reaction container 2 and an opening/closing cover (loading port) 113 (see FIG. 2) for loading each reagent bottle 10 into the reagent disk 9.

The reagent dispensing mechanisms 7 and 8 that are rotatable and vertically movable are installed between the reaction disk 1 and the reagent disk 9, and include the reagent probes 7a and 8a, respectively. The reagent syringe 18 is connected to the reagent probes 7a and 8a. The reagent probes 7a and 8a each move while describing a circular arc about a rotational axis, access an interior of the reagent disk 9 from the reagent probe suction port 111, and dispense the reagent from each reagent bottle 10 into one reaction container 2.

The cleaning mechanism 3, the light source 4a, the spectrophotometer 4, and the stirring mechanisms 5 and 6 are also disposed around the reaction disk 1. The cleaning pump 20 is connected to the cleaning mechanism 3. The cleaning tanks 13, 30, 31, 32, and 33 are installed in operating ranges of the reagent dispensing mechanisms 7, 8, the sample dispensing mechanism 11, and the stirring mechanisms 5, and 6. Each sample container 15 contains a test sample (analyte) such as blood, is mounted on the rack 16, and is conveyed by the sample conveying mechanism 17. Each mechanism is connected to the controller 21.

The controller 21 is configured with a computer or the like, exercises control over operations of each mechanism within the automatic analyzer, and performs a computing process for determining a concentration of a predetermined component in a liquid sample such as blood or urine.

The controller 21 exercises control particularly such that a gripper mechanism 106, to be described later, completes an operation in one cycle from arrival on the opening/closing cover 113 until completion with loading of the reagent bottle 10 into the reagent disk 9. The controller 21 also exercises control such that a reagent mounting unit 103, to be described later, quickly returns into a second cool box 110 after the gripper mechanism 106 grips the reagent bottle 10. Moreover, the controller 21 exercises control such that an operation from installation of the reagent bottle 10 in the reagent mounting unit 103 until opening the reagent bottle 10 is actuated independently without synchronization with analysis operations.

Here, the sample probe 11a of the sample dispensing mechanism 11 repeats operations of drawing in the sample within the sample container 15 by suction and delivering the sample into the reaction container 2 during analysis. One cycle means a repetition period of this suction/delivery of the sample. Furthermore, the reaction disk 1 is stopped to receive the sample and the reagent in one reaction container 2, and driven to rotate for receiving another sample and another reagent in another reaction container 2. In other words, one cycle means a repetition period of this rotation/stop of the reaction disk. If the automatic analyzer has a processing capability of, for example, 1000 tests/h, one cycle is 3.6 seconds.

Furthermore, "the reagent mounting unit 103 quickly returns into the second cool box 110" means, for example, that the reagent mounting unit 103 returns before the reagent bottle 10 gripped by the gripper mechanism 106 is loaded into the reagent disk 9.

Moreover, the sample dispensing mechanism 11, the reagent dispensing mechanisms 7 and 8, and the reagent disk 9 repeat periodic operations during analysis. The "analysis operations" mean the periodic operations of these mechanisms, and "without synchronization with analysis operations" means that the operation is not synchronized with these periodic operations.

Description of an ordinary configuration of the automatic analyzer is finished here.

A test sample analysis process performed by the automatic analyzer described above is normally executed in accordance with the following order.

First, the sample within one sample container 15 mounted on the rack 16 conveyed close to the reaction disk 1 by the sample conveying mechanism 17 is dispensed into one reaction container 2 on the reaction disk 1 by the sample probe 11a of the sample dispensing mechanism 11. Next, the reagent used for analysis is dispensed into the reaction container 2 into which the sample is previously dispensed, from one reagent bottle 10 on the reagent disk 9 by the reagent dispensing mechanisms 7 and 8. Subsequently, a mixture liquid of the sample and the reagent within the reaction container 2 is stirred by the stirring mechanism 5.

Light generated from the light source 4a is transmitted by the reaction container 2 containing the mixture liquid, and a luminous intensity of the transmitted light is measured by the spectrophotometer 4. The luminous intensity measured by the spectrophotometer 4 is sent to the controller 21 via an A/D converter and an interface. The controller 21 performs computation to determine the concentration of a predetermined component in the liquid sample such as blood or urine, and a result is displayed on a display unit (not shown) or the like.

Figure 2:
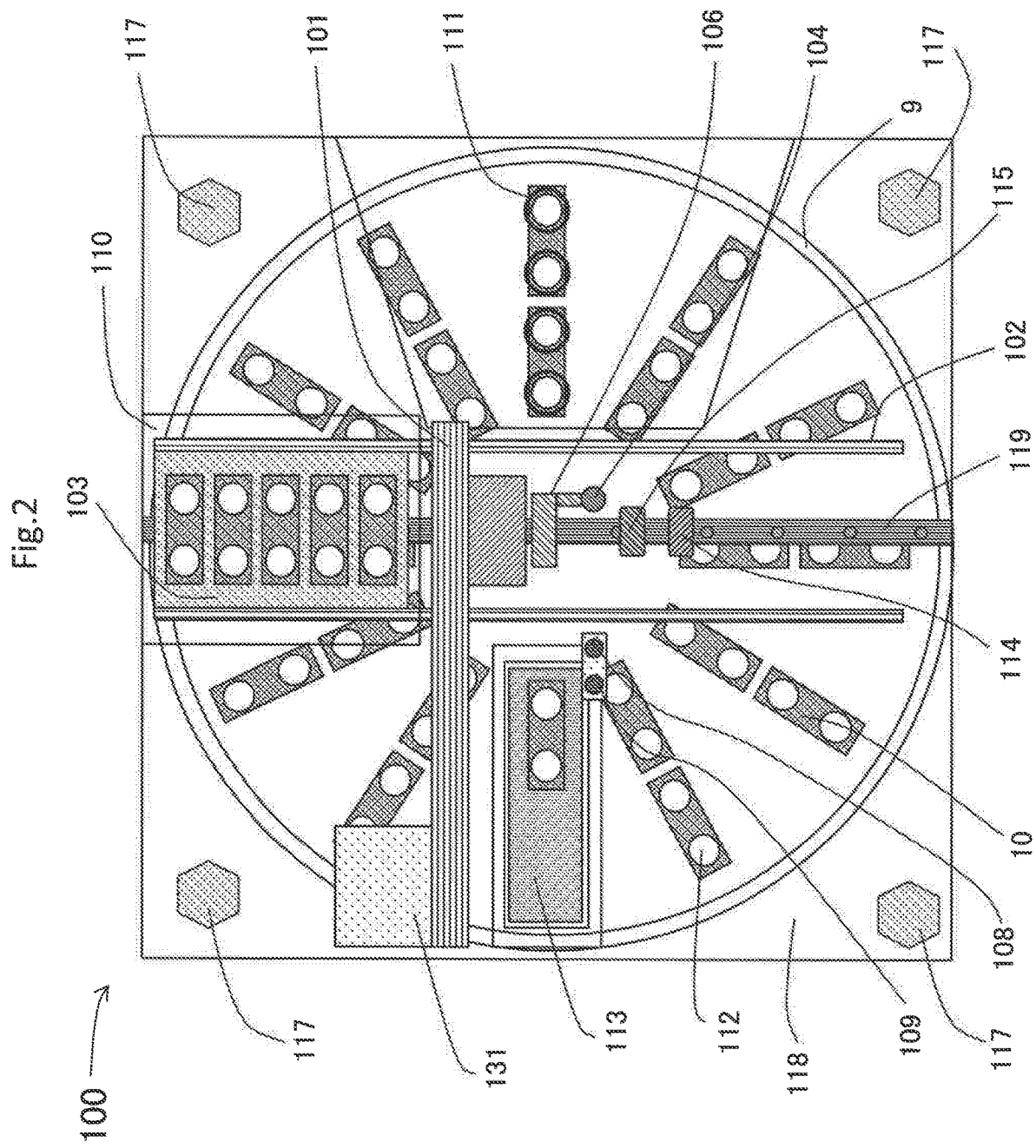
FIG. 2 is a schematic diagram explaining an example of an autoloader mechanism provided in an automatic analyzer according to a first embodiment of the present invention.
Figure 3:
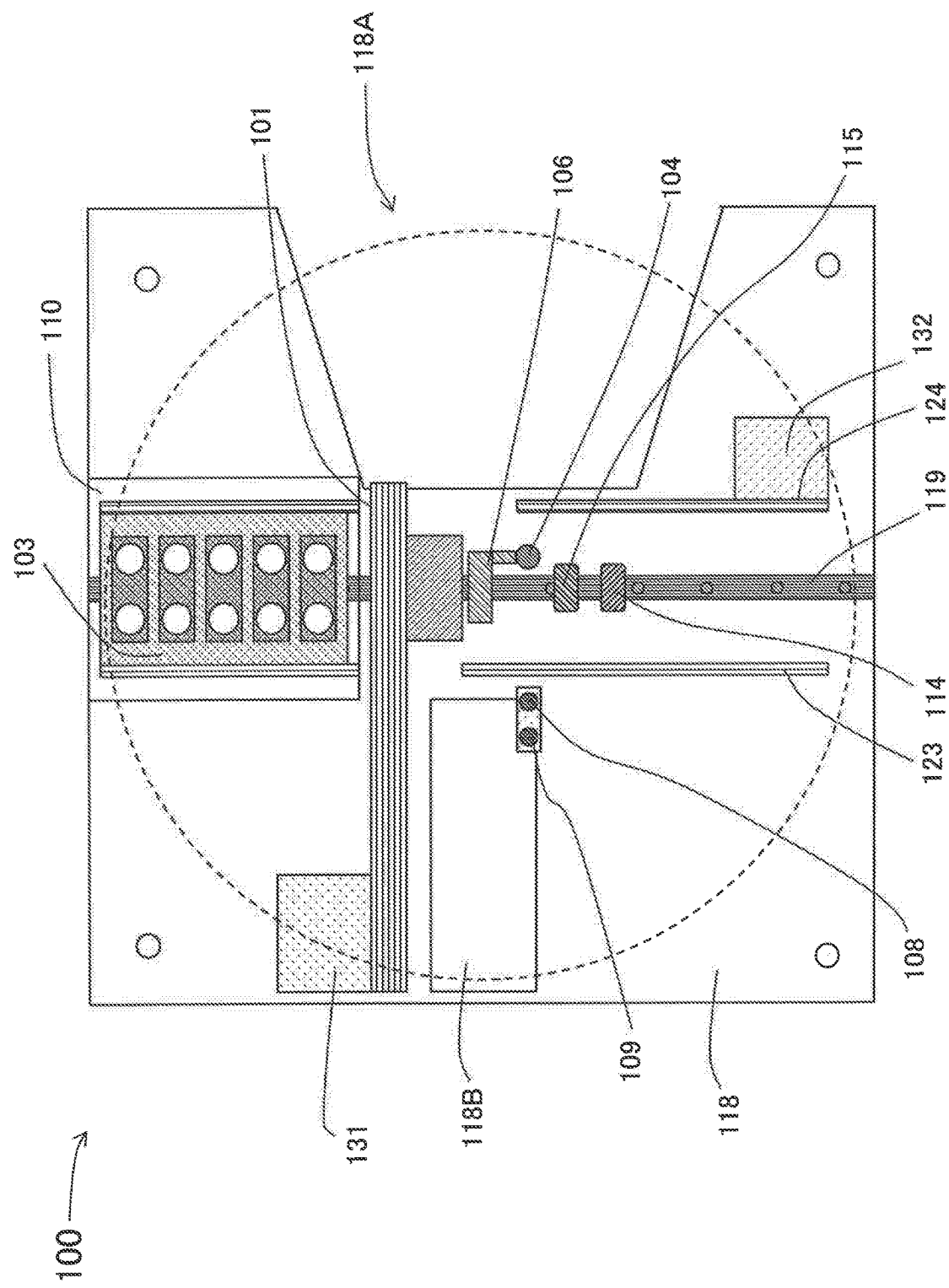
FIG. 3 is a schematic diagram explaining an example of the autoloader mechanism provided in the automatic analyzer according to the first embodiment of the present invention.
Figure 5:
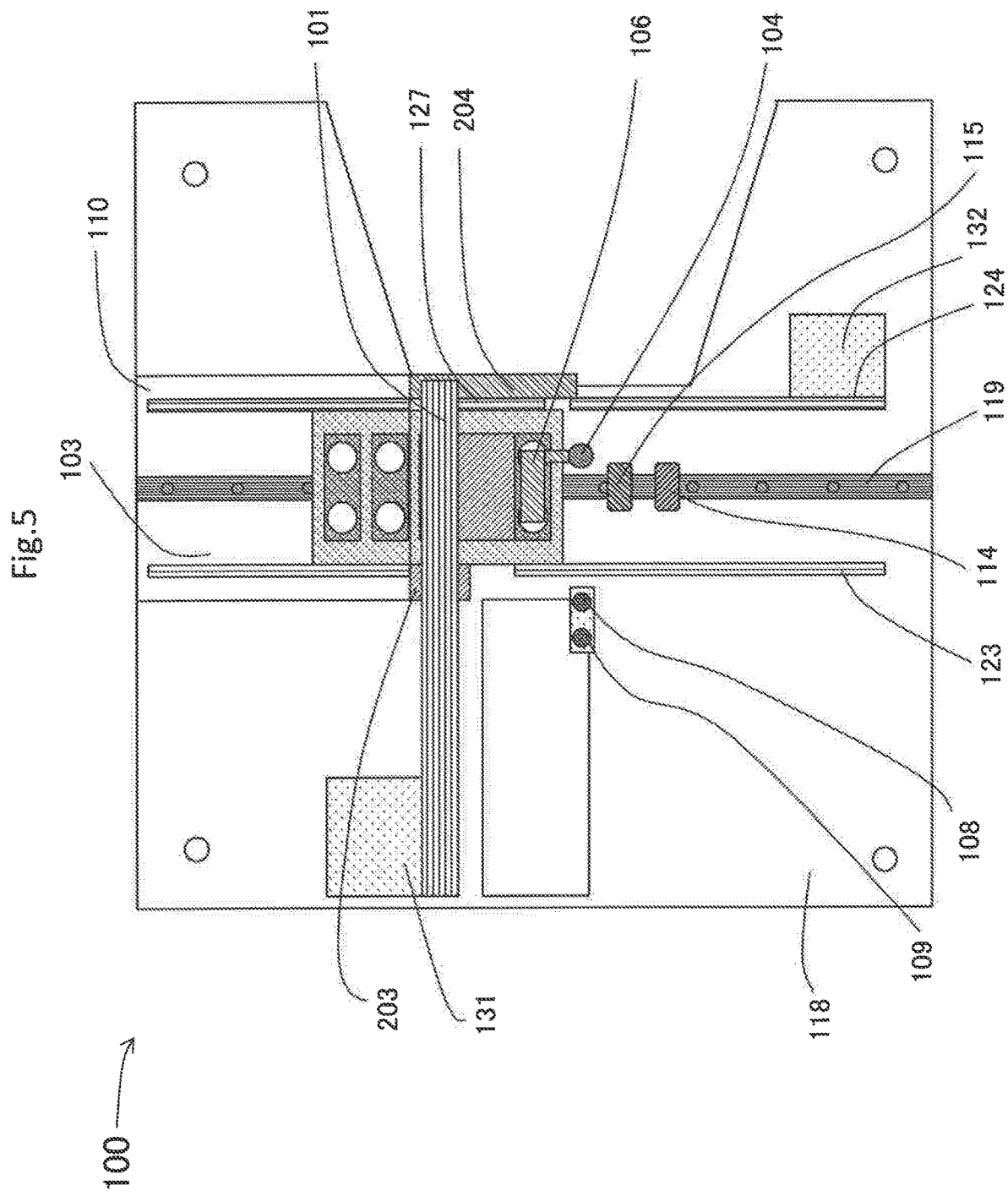
FIG. 5 is a schematic diagram explaining an example of the autoloader mechanism provided in the automatic analyzer according to the first embodiment of the present invention.
Figure 6:
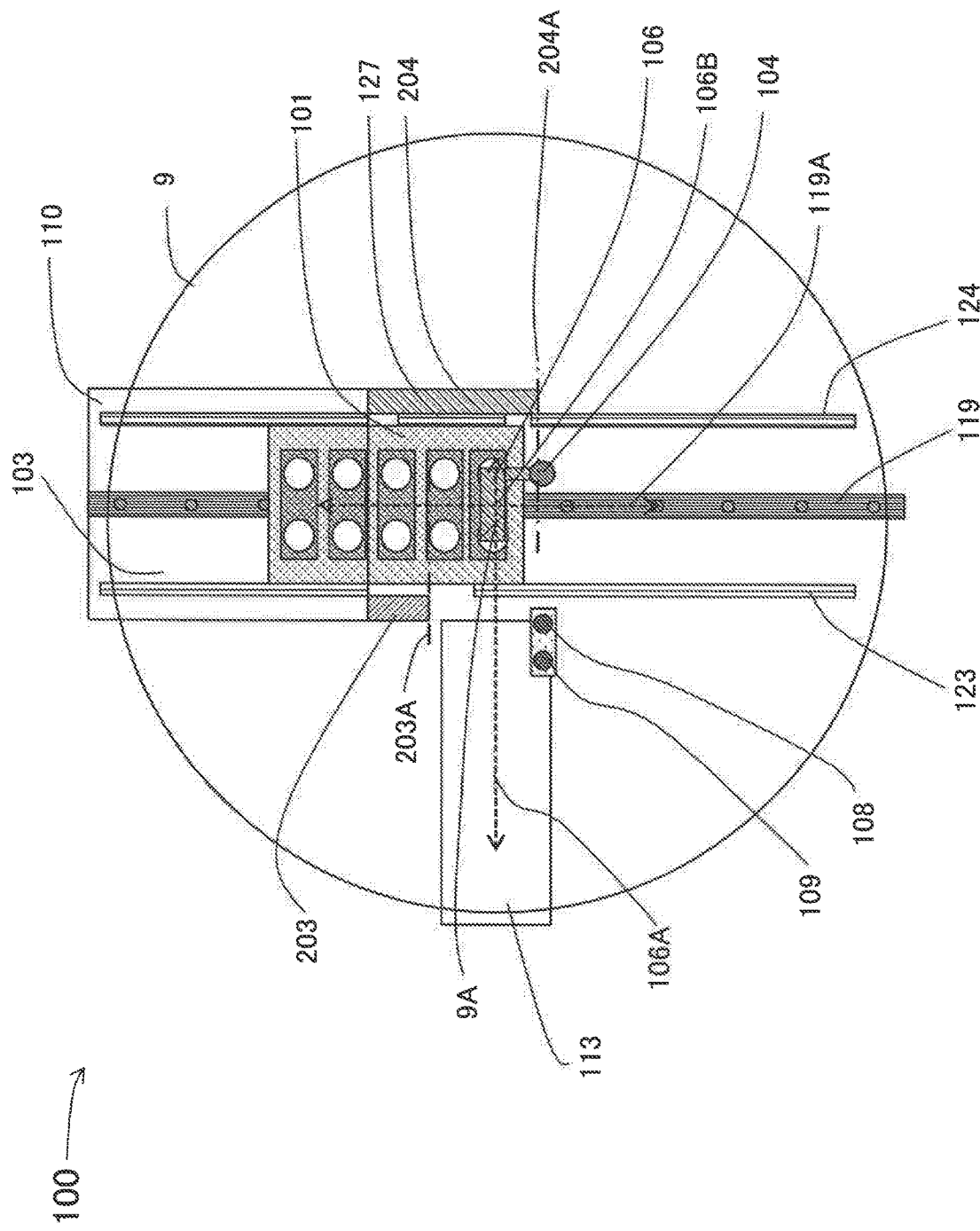
FIG. 6 is a schematic diagram explaining an example of the autoloader mechanism provided in the automatic analyzer according to the first embodiment of the present invention.

A configuration of the autoloader mechanism 100 will next be described with reference to FIG. 2 and the following drawings. FIG. 2 shows an outline of the autoloader mechanism 100, and FIGS. 3, 5, and 6 show a state in which the autoloader mechanism 100 is removed from the automatic analyzer.

Figure 26:
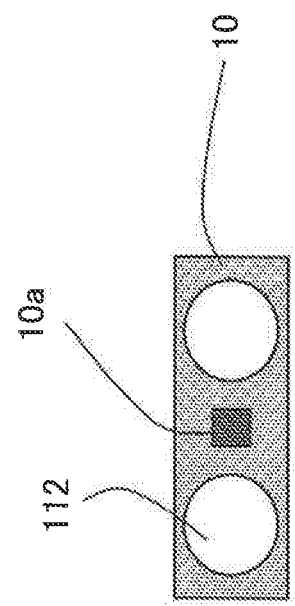
FIG. 26 shows an example of an outline of a reagent bottle.

As shown in FIG. 26, a lid 112 is attached to a reagent probe suction port position of each reagent bottle 10 for hermetically closing an interior of the reagent bottle 10, and the reagent bottle 10 is normally installed into the automatic analyzer after removing the lid 112 at a time of setting into the automatic analyzer. However, there has been recently known a method of drawing in the reagent within the reagent bottle 10 by suction by boring an incision-like hole in the lid 112 and inserting the reagent probes 7a and 8a into an incision portion. Since an opening portion of the lid 112 is the small incision, it is possible to minimize contact of the reagent with outside air and reduce degradation of the reagent compared with a conventional technique. In such a case, when an operator installs an unopened, new reagent bottle 10 into the automatic analyzer, operations from boring a hole in the lid 112 of the reagent bottle 10 until automatic installation of the reagent bottle 10 in the reagent disk 9 are carried out. A mechanism that automatically loads/unloads each reagent bottle 10 into/from the reagent disk 9 irrespectively of whether the lid 112 is removed or whether the lid 112 is incised is the autoloader mechanism 100.

The autoloader mechanism 100 is disposed above the reagent disk 9, and configured as shown in FIGS. 2 and the like. In FIG. 2, the autoloader mechanism 100 includes the reagent mounting unit 103, a reagent mounting mechanism (conveying line) 102, a reagent conveying mechanism (reagent conveying unit) 101, the second cool box (reagent cool box) 110, a needle cleaning tank 108, a needle drying port 109, a bottle orientation detecting sensor 114, an RFID sensor 115, struts 117, and a metallic plate 118, and is configured such that all these mechanisms except for the struts 117 are attached to one metallic plate 118. As shown in FIG. 3, opening portions 118A and 118B are formed in the metallic plate 118.

A space of the opening portion 118A is a location where each of the reagent probes 7a and 8a of the reagent dispensing mechanisms 7 and 8 moves down to the reagent bottle 10 in the reagent disk 9 and draws in the reagent by suction during the operation. The presence of this opening portion 118A can prevent interference between the operations of the autoloader mechanism 100 and those of the reagent dispensing mechanism 7 or 8. In other words, most of the operations of the autoloader mechanism 100 are not synchronized with the analysis operations and can be carried out independently.

A space of the opening portion 118B is a location where the gripper mechanism 106 of the reagent conveying mechanism 101 loads each reagent bottle 10 into the reagent disk 9, and is formed generally at the same location as that where the opening/closing cover 113 is located.

Reference is made back to FIG. 2. The metallic plate 118 is configured to be supported by the four struts 117. The four struts 117 are disposed on an outer circumferential side of the reagent disk 9 on the automatic analyzer, and a height of the struts 117 is larger than a height at which the cover is attached to an upper portion of the reagent disk 9. That is, the autoloader mechanism 100 is configured to be disposed above the reagent disk 9. It is noted that the number of struts 117 is not limited to four and may be set with a balance of the mechanisms taken into consideration.

Figure 4:
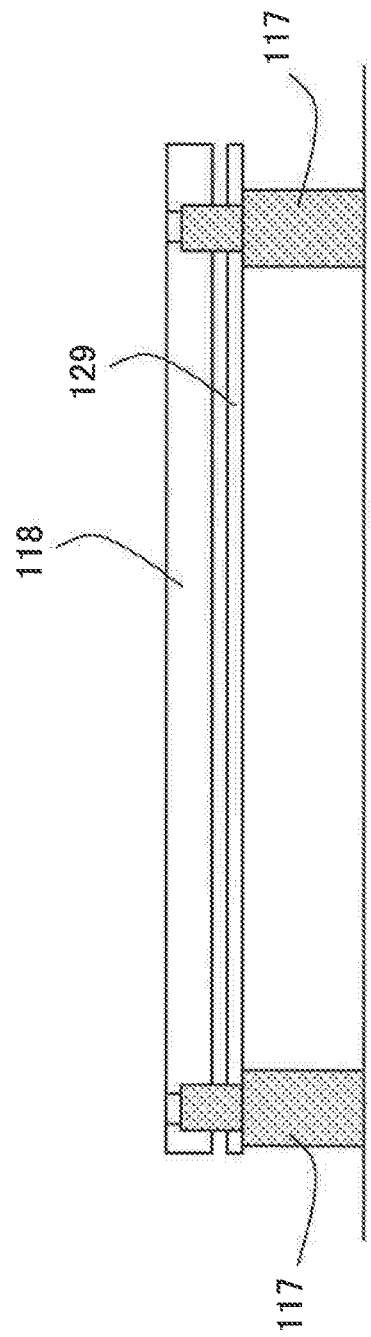
FIG. 4 is a schematic diagram of a side surface of the autoloader mechanism provided in the automatic analyzer according to the first embodiment of the present invention.

Furthermore, as shown in FIG. 4, a plate 129 is provided between the metallic plate 118 and the reagent disk 9 and holes are formed in this plate 129 at positions of the struts 117. The metallic plate 118 is disposed on the reagent disk 9 while being slid on an upper surface of the plate 129.

The opening/closing cover 113 is a cover for preventing release of cold air inside of the reagent disk 9 that has been kept cool and normally closed. When the reagent conveying mechanism 101 accesses the reagent disk 9, the opening/closing cover 113 is opened and operates to be able to load/unload the reagent bottle 10 into/from the reagent disk 9.

The reagent mounting unit 103 is an unit in which the operator installs the reagent bottles 10 when the reagent bottles 10 are loaded into the automatic analyzer, and the reagent mounting unit 103 is actuated by the reagent mounting mechanism 102 to operate in a vertical direction in FIGS. 2 and 3. An operating range of the reagent mounting unit 103 is restricted on the metallic plate 118 on which the autoloader mechanism 100 is disposed, whereby the reagent mounting unit 103 can be accommodated within the automatic analyzer. The reagent mounting unit 103 has a structure such that a plurality of reagent bottles 10 can be installed linearly. The reagent mounting unit 103 is, for example, a tray in which a plurality of reagent bottles 10 can be mounted. The reagent mounting unit 103 and the reagent mounting mechanism 102 will be described later in detail.

The second cool box 110 is a cool box for temporarily kept cool the reagent bottles 10 installed in the reagent mounting unit 103 along with the reagent mounting unit 103 before the reagent bottles 10 are loaded into the reagent disk 9.

In addition, as shown in FIGS. 5 and 6, the second cool box 110 has a first door 203 and a second door 204 as doors for entry and exit of the reagent mounting unit 103. The first door 203 and the second door 204 are configured as hinged double doors and normally closed. Out of the two doors, the second door 204 closer to the reagent probe suction port 111 is longer than the first door 203 closer to the opening/closing cover 113. Owing to this, a position 106B at which the gripper mechanism 106 grips the reagent bottle 10 is closer to the second cool box 110 than a tip end position (longest distance arrival point) 204A of the second door 204 of the second cool box 110 when the second door 204 is opened to a maximum angle. Furthermore, a tip end position (longest distance arrival point) 203A of the first door 203 when the first door 203 is opened to a maximum angle is closer to the second cool box 110 than the position 106B at which the gripper mechanism 106 grips the reagent bottle 10. A structure of the second cool box 110 will be described later in detail.

Reference is made back to FIG. 2. The reagent conveying mechanism 101 is a mechanism for conveying the reagent bottles 10 installed in the reagent mounting unit 103 into the reagent disk 9. The reagent conveying mechanism 101 has, as constituent components, the gripper mechanism (gripper unit) 106 that grips each reagent bottle 10, a reagent bottle lid opening mechanism 104 that bores a hole in the lid 112 of the reagent bottle 10, a vertical drive motor 130 (see FIG. 13) that vertically moves the gripper mechanism 106, and a horizontal drive motor 131 that drives the gripper mechanism 106 and the reagent bottle lid opening mechanism 104 in a horizontal portion in FIG. 2. A structure of the reagent conveying mechanism 101 will be described later in detail.

The bottle orientation detecting sensor 114 and the RFID sensor 115 are disposed on an operating route of the reagent mounting unit 103. The bottle orientation detecting sensor 114 is a sensor that measure whether reagent bottles 10 are installed and measures an installation direction thereof. The bottle orientation detecting sensor 114 detects a color of a label stuck to the reagent bottle 10 and detects a direction of the reagent bottle 10 installed in the reagent mounting unit 103. The RFID sensor 115 obtains information about the reagent in the reagent bottle 10 recorded on an RFID tag 10a attached to the reagent bottle 10.

Preferably, an arrangement interval at which the RFID sensor 115, the bottle orientation detecting sensor 114, the gripper mechanism 106, and a needle 105 are arranged is set equal in length to an arrangement pitch of the reagent bottles 10 installed in the reagent mounting unit 103 for improvement of throughput. This is because the operation of the gripper mechanism 106 or the needle 105 can be started during detection by the bottle orientation detecting sensor 114 depending on situations. In other words, a longitudinal movement amount of the reagent mounting unit 103 can be obtained by a minimum operation.

It is desirable here that a home position of the reagent conveying mechanism 101 is a left-side position in an example of FIG. 3. The reason is as follows. The first door 203 and the second door 204 of the second cool box 110 are opened with the operation of the reagent mounting unit 103. Therefore, if the reagent conveying mechanism 101 is configured to move to the reagent mounting unit 103 after the first door 203 and the second door 204 are opened, the reagent conveying mechanism 101 can be made closer to the second cool box 110 and can be disposed in a compact manner. Furthermore, if the home position of the reagent conveying mechanism 101 is closer to the shorter first door 203, then the reagent conveying mechanism 101 can move without interference and can be made closer to the second cool box 110, and a moving distance of the reagent mounting unit 103 can be made shorter. The home position means herein a position at which the reagent conveying mechanism 101 is on standby before starting the operation.

It is desirable that a home position of the reagent mounting unit 103 is a position moved into the second cool box 110. The reason is as follows. When a reagent mounting mechanism motor 132 is used, a sensor is often used to stop the reagent mounting unit 103. By setting the home position of the reagent mounting unit 103 within the second cool box 110 while sensor state is always monitored, the sensor can be used to stop the reagent mounting unit 103 within the second cool box 110 and it is possible to always determine that the reagent installed in the reagent mounting unit 103 can be kept cool in a state in which the sensor is turned on. The home position means herein a position at which the reagent mounting unit 103 is on standby before starting the operation.

Figure 7:
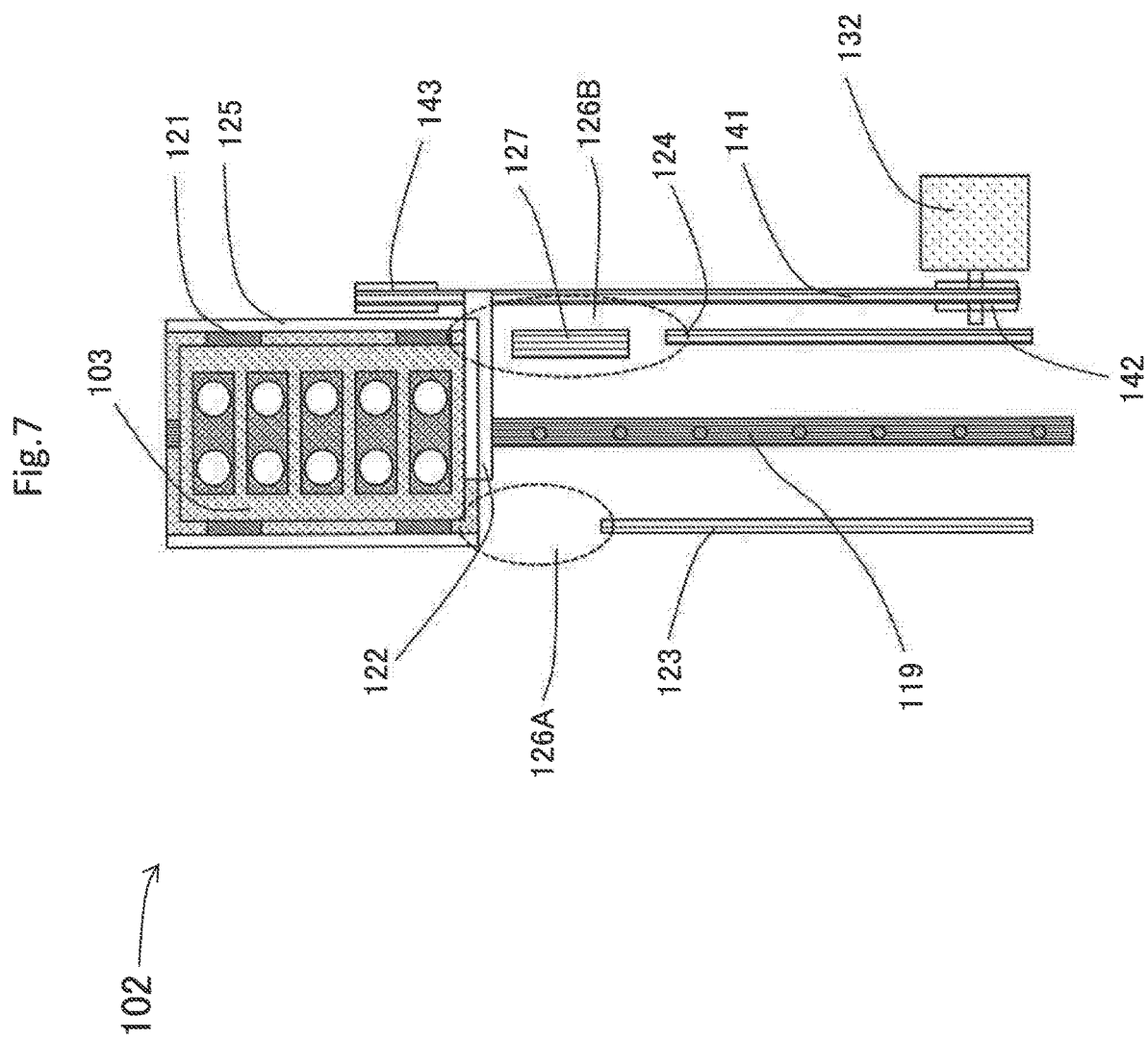
FIG. 7 is a schematic diagram explaining an example of a reagent mounting mechanism of the autoloader mechanism provided in the automatic analyzer according to the first embodiment of the present invention.

The structures of the reagent mounting mechanism 102, the reagent conveying mechanism 101, and the second cool box 110 will next be described in detail. First, the structure of the reagent mounting mechanism 102 will be described in detail with reference to FIG. 7. FIG. 7 shows only the reagent mounting mechanism 102.

In FIG. 7, the reagent mounting mechanism 102 is configured with the reagent mounting unit 103, a linear guide 119, a first rail 123, a second rail 124, an auxiliary rail 127, a reagent mounting mechanism belt 141, a first holding unit 122, a first pulley 142, a second pulley 143, and the reagent mounting mechanism motor 132.

A horizontal position of the linear guide 119 is between the reagent probe suction port 111 and the opening/closing cover 113 of the reagent disk 9, and connects a position of a cover 116 (see FIG. 8) for the operator to install the reagent bottle 10 in the reagent mounting unit 103 and the second cool box 110. The reagent mounting unit 103 moves on the linear guide 119.

A structure around the cover 116 will now be described.

The autoloader mechanism 100 has a structure of being normally interlocked to prohibit access to an interior of the autoloader mechanism 100, and the structure is such that when the operator installs the reagent in the reagent mounting unit 103, an interlocking mechanism of the cover 116 is released after the reagent mounting unit 103 moves to a front of the automatic analyzer (downward in FIG. 2 and the like), and that the cover 116 is opened to allow the operator to install the reagent in the reagent mounting unit 103. In this autoloader mechanism 100, an interior of the cover 116 is an installation position at which the operator installs the reagent bottles 10 in the reagent mounting unit 103.

Figure 9:
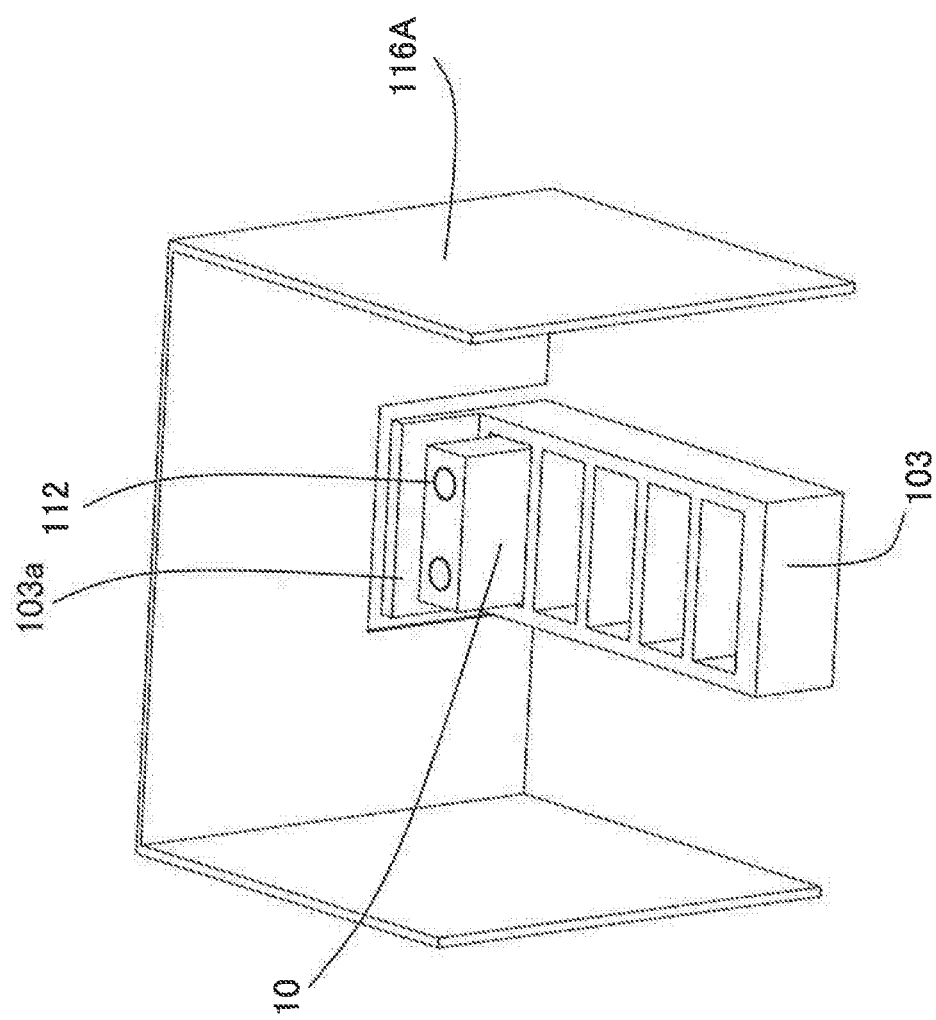
FIG. 9 is an explanatory diagram of an outline of a reagent conveying mechanism during reagent bottle replacement in the automatic analyzer according to the first embodiment of the present invention.

The autoloader mechanism 100 has a structure such that when the cover 116 is opened, the interior of the cover 116 is covered with a sidewall 116A and has only an open unit at a magnitude to such a degree that the reagent mounting unit 103 can pass through the interior, as shown in FIG. 9. That is why the interior of the autoloader mechanism 100 is inaccessible. A high wall 103a is installed in rear of the reagent mounting unit 103, so that the interior of the autoloader mechanism 100 is structured to be inaccessible even when there is no reagent bottle 10. A height of the wall 103a is desirably equal to or larger than a height at which the reagent bottles 10 are installed. This is intended to reduce a probability of operator's access to the interior of the autoloader mechanism 100 when there is no reagent bottle 10 installed and a gap becomes wide by setting the height of the wall 103a equal to or larger than the installation height of the reagent bottles 10. Configuring the cover 116 as shown in FIG. 9 enables the operator to replace the reagent bottles 10 even while the automatic analyzer is conducting analysis.

Figure 10:
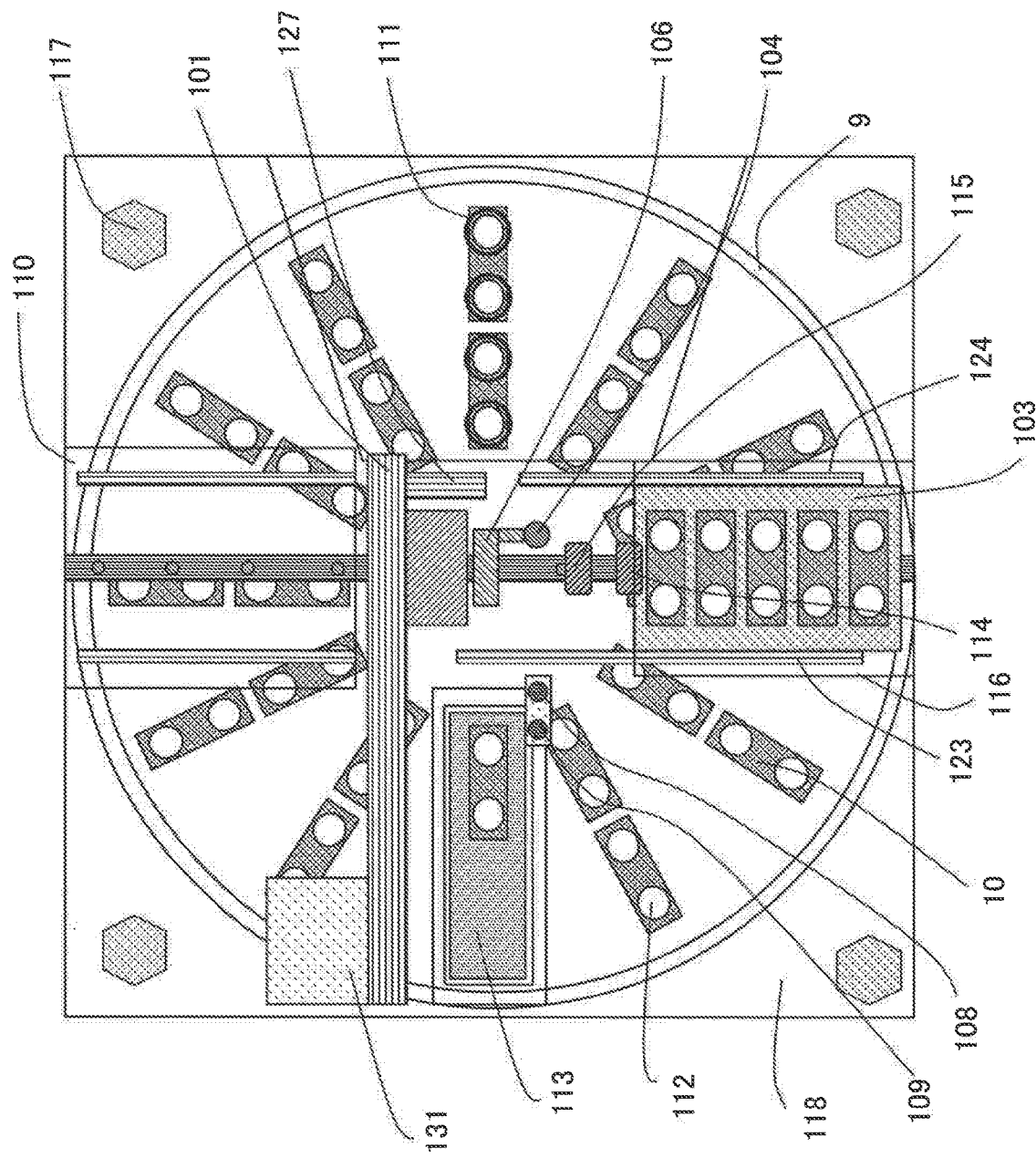
FIG. 10 is a schematic diagram explaining an example of operations of the autoloader mechanism provided in the automatic analyzer according to the first embodiment of the present invention.

As a method of installing the reagent bottles 10 with the reagent mounting unit 103 located at a position of the cover 116, the operator may further pull out the reagent mounting unit 103 toward the operator after the reagent mounting unit 103 is stopped to improve workability of replacement of the reagent bottles 10 or the reagent mounting unit 103 can be designed detachable to achieve improvement of the workability. Needless to say, the operator may directly replace the reagent bottles 10 at a position shown in FIG. 10 without pulling out the reagent mounting unit 103. A method of fixing the reagent mounting unit 103 can be easily realized by carrying out, for example, fixing of the reagent mounting unit 103 by a positioning pin or a magnet. FIG. 10 shows that the reagent mounting unit 103 moves to the front of the automatic analyzer and is stopped.

The first rail 123 is disposed on an opening/closing cover 113-side of the linear guide 119 in parallel to the linear guide 119, and the second rail 124 is disposed on a reagent probe suction port 111-side of the linear guide 119 in parallel to the linear guide 119 and the first rail 123.

The reagent mounting mechanism belt 141 is disposed side by side with the linear guide 119 and the like, and the reagent mounting mechanism belt 141 is coupled to the reagent mounting unit 103 via the first holding unit 122. This first holding unit 122 has a structure such that a portion thereof in contact with the door of the second cool box 110 is sufficiently thin compared with a packing provided on the door of the second cool box 110 so that an interior of the second cool box 110 is kept at a low temperature. The portion of this first holding unit 122 in contact with the lid of the second cool box 110 is structured to be sandwiched between the door and a main body of the second cool box 110. Structuring this portion to be sufficiently thin can, therefore, ensure airtightness. The first pulley 142, the second pulley 143, and the reagent mounting mechanism motor 132 are attached to the ends of the reagent mounting mechanism belt 141. The reagent mounting mechanism 102 is configured such that when the reagent mounting mechanism motor 132 rotates, the reagent mounting mechanism belt 141 rotates in an interlocked fashion via the first pulley 142, and the reagent mounting unit 103 coupled to the reagent mounting mechanism belt 141 via the first holding unit 122 operates in the vertical direction in FIG. 7 in proportion to a rotation movement of this reagent mounting mechanism belt 141.

Furthermore, a plurality of tires 121 are attached to the reagent mounting unit 103. When the reagent mounting unit 103 moves in the vertical direction in FIG. 7, the tires 121 move while being slid on upper surfaces of the first rail 123 and the second rail 124.

Moreover, as shown in FIG. 7, a gap 126A is provided between the first rail 123 and a second cool box inner conveying surface 125, while a gap 126B is provided between the second rail 124 and the second cool box inner conveying surface 125. The gap 126A is provided to secure an opening/closing track of the first door 203, while the gap 126B is provided to secure an opening/closing track of the second door 204.

Further, the auxiliary rail 127 is provided on an inner side of the second cool box 110 to bury the gap 126B between the second rail 124 and the second cool box inner conveying surface 125. When the second door 204 is opened, this auxiliary rail 127 is opened along with the second door 204 in a state of being attached to the inner side of the second door 204. The auxiliary rail 127 buries most of the gap 126B between the second rail 124 and the second cool box inner conveying surface 125 when the second door 204 is opened. A rail on the second rail 124-side is thereby completed. The gap 126A between the first rail 123 and the second cool box inner conveying surface 125 is wide. However, the tires 121 ride on the auxiliary rail 127 attached to the second door 204 that is opened when the reagent mounting unit 103 exits from the second cool box 110 and the plurality of tires 121 are provided, whereby the reagent mounting unit 103 operates longitudinally without problems to enable the reagent bottles 10 to be conveyed.

Here, the tires 121 of the reagent mounting unit 103 are desirably larger than a gap between the second rail 124 and the auxiliary rail 127 and a gap between the auxiliary rail 127 and the second cool box inner conveying surface 125 since the tires 121 move beyond the gaps 126A and 126B.

Moreover, making the first rail 123, the second rail 124, the auxiliary rail 127, and the second cool box inner conveying surface 125 identical in upper-surface-side height enables the reagent mounting unit 103 to operate smoothly even with presence of the gaps 126A and 126B.

In this way, the first rail 123, the second rail 124, and the linear guide 119 are disposed between the reagent probe suction port 111 and the opening/closing cover 113 and the reagent mounting unit 103 is actuated near a center of the reagent disk 9. A space that is not conventionally used is thereby used. In addition, the autoloader mechanism 100 is disposed so that the operating range thereof concentrates above the reagent disk 9, thereby achieving space saving of the automatic analyzer.

Furthermore, since the autoloader mechanism 100 operates compactly in the operating range that is only on the reagent disk 9 within the automatic analyzer, unnecessary moving distances of the mechanisms are eliminated and operation efficiency can be improved. In other words, throughput is improved and time for loading the reagent bottle 10 can be shortened.

While the first embodiment is described while assuming that the number of tires is four, a conveying operation may be stabilized by increasing the number of tires.

Figure 11:
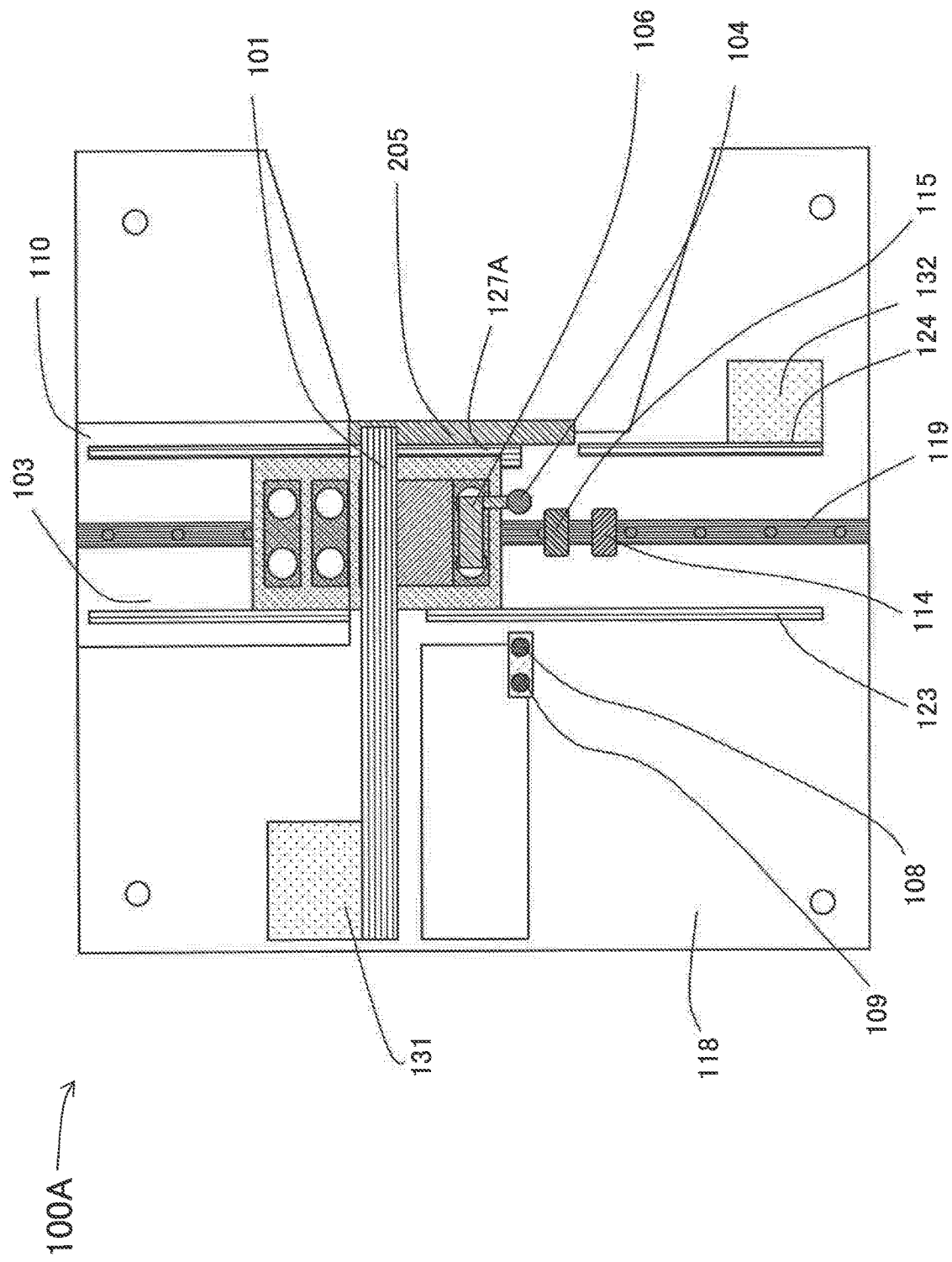
FIG. 11 is a schematic diagram explaining another example of the autoloader mechanism provided in the automatic analyzer according to the first embodiment of the present invention.
Figure 12:
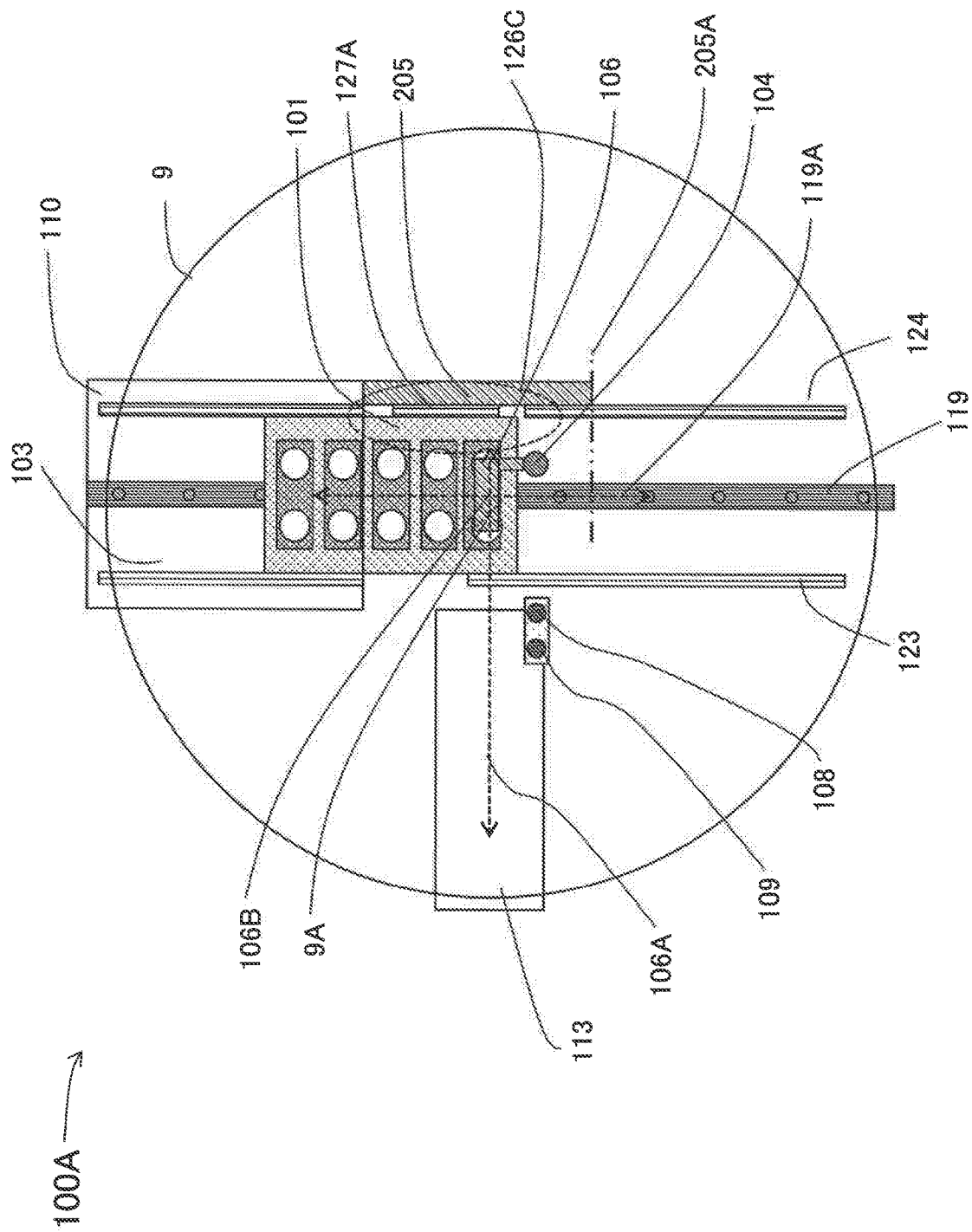
FIG. 12 is a schematic diagram explaining another example of the autoloader mechanism provided in the automatic analyzer according to the first embodiment of the present invention.

Moreover, the opening/closing doors of the second cool box 110 are not limited to hinged double doors as shown in FIGS. 5 and 6. For example, as shown in FIGS. 11 and 12, a single third door 205 can be used for entry and exit of the reagent mounting unit 103. As shown in FIG. 12, a position 106B at which the gripper mechanism 106 grips the reagent bottle 10 is closer a position closer to the second cool box 110 than a tip end position (longest distance arrival point) 205A of the third door 205 of the second cool box 110 when the third door 205 is opened to a maximum angle.

Furthermore, an auxiliary rail 127A is provided inside of the third door 205 to bury a gap 126C between the second rail 124 and the second cool box inner conveying surface 125 of the reagent mounting unit 103 in the second cool box 110. When this auxiliary rail 127A is opened to follow the third door 205, a rail on the second rail 124-side is completed.

Figure 13:
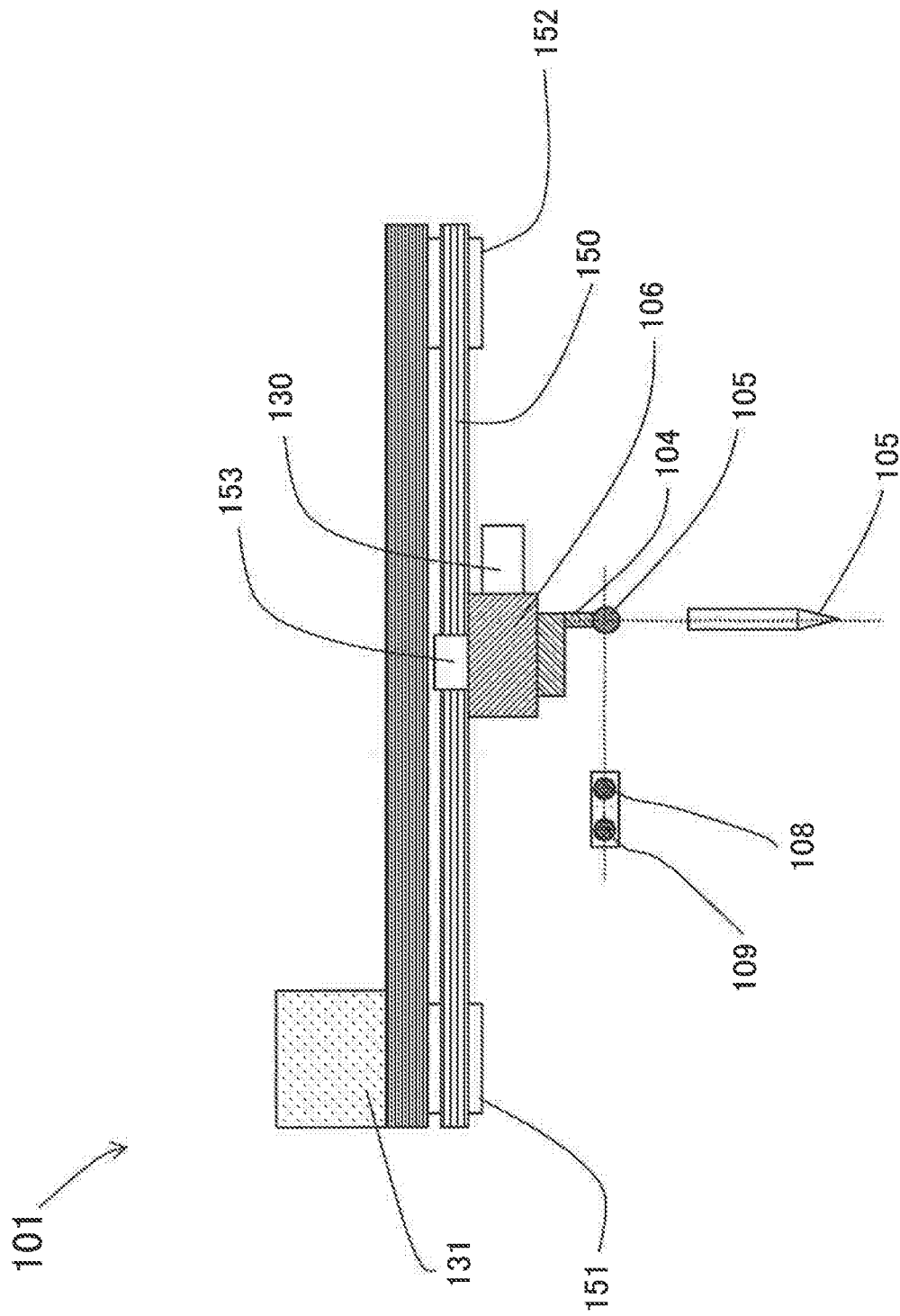
FIG. 13 is a schematic diagram explaining an example of the reagent conveying mechanism of the autoloader mechanism provided in the automatic analyzer according to the first embodiment of the present invention.

FIG. 13 shows only the reagent conveying mechanism 101.

In FIG. 13, in the reagent conveying mechanism 101, a reagent conveying belt 150, the gripper mechanism 106, and the reagent bottle lid opening mechanism 104 are coupled to one another by a second holding unit 153. A third pulley 151 is attached to one end of the reagent conveying belt 150 while a fourth pulley 152 and the horizontal drive motor 131 are attached to the other end thereof. When the horizontal drive motor 131 rotates, the gripper mechanism 106 and the reagent bottle lid opening mechanism 104 operate linearly in the horizontal direction between the position 106B at which the gripper mechanism 106 grasps the reagent bottle 10 in the reagent mounting unit 103 and a position of the opening/closing cover 113 in FIG. 13.

In other words, the reagent mounting unit 103 operates in an installation direction 119A of the linear guide 119 in FIG. 6, while the reagent conveying mechanism 101 operates in an operating direction 106A in which the gripper mechanism 106 conveys the reagent bottles 10 to the opening/closing cover 113 in FIG. 6. In this way, the reagent mounting unit 103 and the reagent conveying mechanism 101 are configured such that the operating directions thereof are orthogonal to each other. At the position 1068 that is an intersecting point between the installation direction 119A of the linear guide 119 and the operating direction 106A of the gripper mechanism 106, the gripper mechanism 106 grips the reagent bottle 10 installed in the reagent mounting unit 103.

The configuration of making ranges of motion of the gripper mechanism 106 and the reagent bottle lid opening mechanism 104 in three directions (horizontal, longitudinal, and vertical directions) is a complicated configuration of setting up a scaffold for supporting four sides, as described above. According to the present embodiment, by contrast, the range of motion of the gripper mechanism 106 is set in two directions, i.e., the horizontal direction in FIG. 2 and the like and the vertical direction (forward and rear directions in FIG. 2 and the like). This can require only two portions to be supported and a structure of supporting the mechanism can be configured with a smaller number of components. Furthermore, the number of adjustment portions of the gripper mechanism 106 can be advantageously reduced since only portions where the gripper mechanism 106 accesses the reagent bottle 10 are the adjustment portions.

Moreover, the reagent conveying mechanism 101 is disposed in such a manner that the operating direction 106A of the gripper mechanism 106 passes through a rotation center 9A of the reagent disk 9.

Reference is made back to FIG. 13. The needle 105 for making an incision in the lid 112 of the reagent bottle 10 is attached to the reagent bottle lid opening mechanism 104. The reagent bottle lid opening mechanism 104 is configured as follows. The needle 105 completed with making an incision in the lid 112 is cleaned by the needle cleaning tank 108 disposed in parallel to the operating direction of the reagent conveying mechanism 101. In a next step, cleaning water is removed by the needle drying port 109 disposed in parallel to the operating direction of the reagent conveying mechanism 101 to prevent the reagent from being diluted with the cleaning water when the lid 112 of the reagent bottle 10 is incited. As shown herein, the needle cleaning tank 108 and the needle drying port 109 are disposed in parallel to the operating direction 106A of the gripper mechanism 106 that is the operating direction of the reagent conveying unit 101, and also disposed between the reagent mounting unit 103 and the opening/closing cover 113. Disposing the needle cleaning tank 108 and the needle drying port 109 in this way enables the space saving of the autoloader mechanism 100 and the needle 105 to be cleaned during movement in the horizontal direction. Therefore, it is possible to shorten operating time.

The gripper mechanism 106 has a hook for gripping the reagent bottle 10, operates vertically by a rotation operation of the vertical drive motor 130, and operates to grip or detach the reagent bottle 10 by putting the hook in a notch portion of the reagent bottle 10. In other words, the gripper mechanism 106 makes a vertical operation by the vertical drive motor 130, and operates to grip the reagent bottle 10, move upward, move horizontally by the horizontal drive motor 131 after moving upward, move downward at a predetermined position, and place the reagent bottle 10.

Moreover, the needle 105 is configured to bore a hole in the lid 112 of the reagent bottle 10 by operating vertically by the rotation operation of the vertical drive motor 130.

Figure 14:
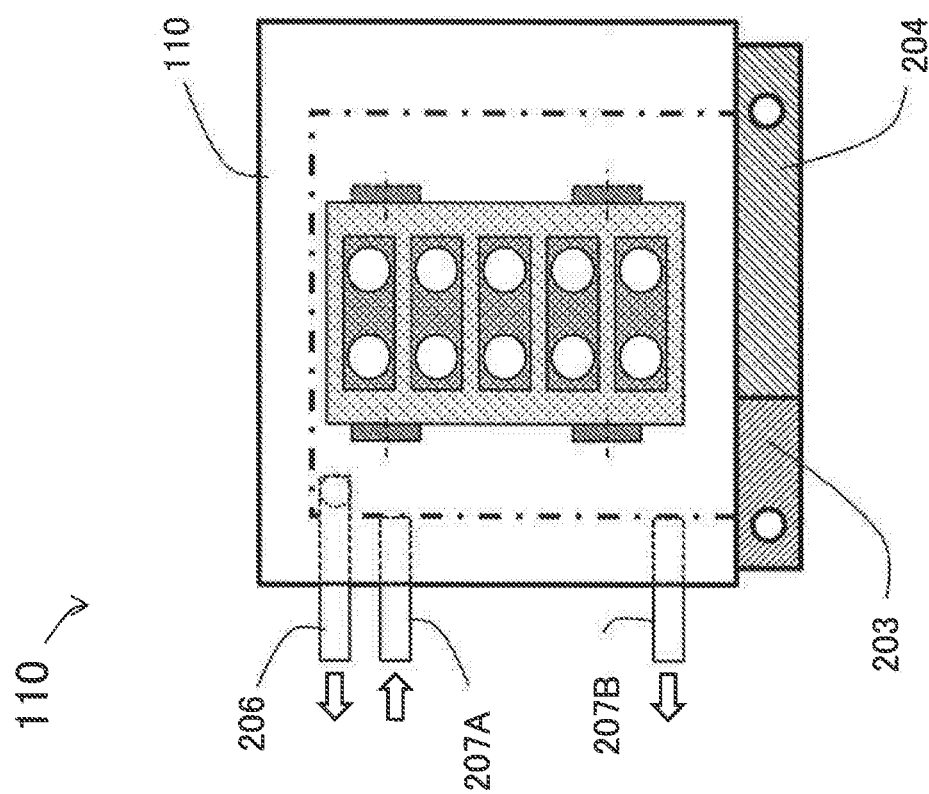
FIG. 14 is a schematic diagram explaining an example of a second cool box of the autoloader mechanism provided in the automatic analyzer according to the first embodiment of the present invention.
Figure 15:
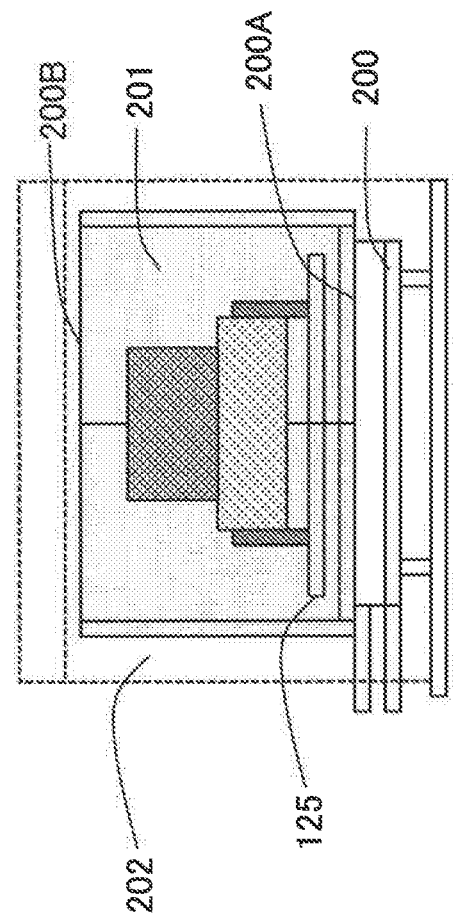
FIG. 15 is a schematic diagram explaining an example of the second cool box of the autoloader mechanism provided in the automatic analyzer according to the first embodiment of the present invention.
Figure 16:
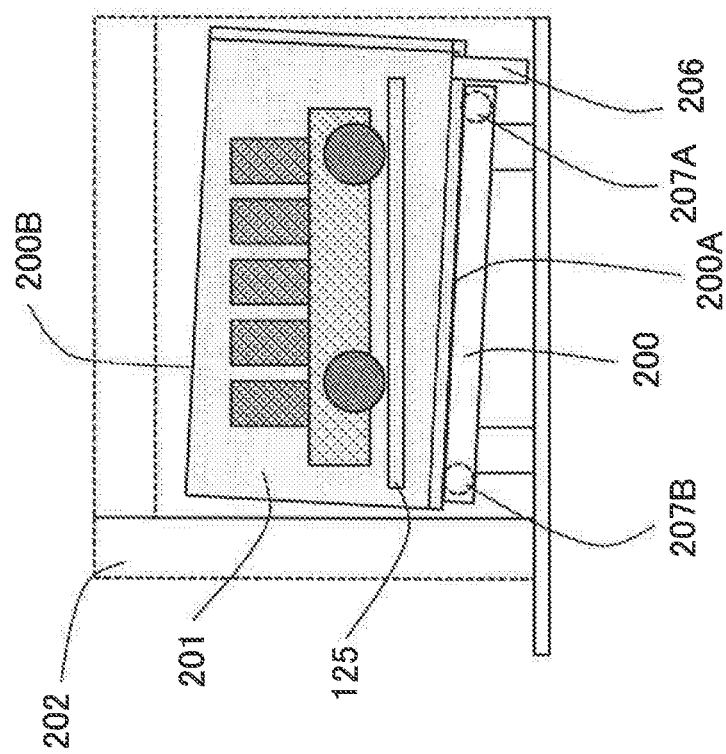
FIG. 16 is a schematic diagram explaining an example of the second cool box of the autoloader mechanism provided in the automatic analyzer according to the first embodiment of the present invention.

FIGS. 14 to 16 show the configuration of the second cool box 110.

As shown in FIG. 14, the interior of the second cool box 110 is hermetically sealed by the first door 203 and the second door 204. The second cool box 110 is configured to supply cold water for cooling the reagent disk 9 that is disposed in a lower portion of the autoloader mechanism 100 from a pipe that circulates the cold water to cool a cooling tank 200. In the first embodiment, it is possible to keep cool the second cool box 110 without adding a new cooling source since the second cool box 110 is disposed on the reagent disk 9.

To circulate the cold water, a method of connecting a joint unit between the reagent disk 9 and the cooling tank 200 of the second cool box 110 by a tube (intake pipe) 207A and a tube (exhaust pipe) 207B each covered with a heat insulating material is normally adopted. However, using a joint (not shown) that can be sealed when being detached can facilitate disconnecting a flow passage. Even if the autoloader mechanism 100 is detached from the automatic analyzer for maintenance or the like, the cold water does not leak out even after the joint is detached and efficient maintenance can be, therefore, carried out.

Furthermore, as shown in FIG. 15, heat exchanger plates 201 are attached to the interior of the second cool box 110 in such a manner as to closely adhere to the cooling tank 200. The heat exchanger plates 201 are provided on four surfaces of the second cool box 110 except for a front surface on which the doors are present and a bottom surface on which the cooling tank 200 is present. With this configuration, it is possible to attain a cooling function at a low cost. Increasing the number of surfaces for circulating cooling water normally requires means, for example, for welding and hermetically sealing components in order to satisfy the cooling function. With the configuration using the heat exchanger plates 201, by contrast, it is required only to circulate the cooling water on the bottom surface, so that it is possible to simplify manufacturing of the cooling tank 200 and reduce a manufacturing cost. Reduction of the manufacturing cost is also attributed to the fact that a welded portion is only the bottom surface and the number of welded portions can be kept to a minimum. Here, a material of the heat exchanger plates 201 is desirably a material such as copper or aluminum having a higher thermal conductivity than that of stainless steel (for example, SUS304 having a thermal conductivity of 16.3 W/m·°C.).

While the cooling tank 200 is cooled using the cold water from the reagent disk 9 as described above, surfaces of the cooling tank 200 that can be cooled are five surfaces except for a front surface used for the loading/unloading operations of the reagent mounting unit 103. However, an SUS material is normally, often used as a material of the cooled surfaces for rust prevention and improvement of maintenance. If the cooling water is circulated on an upper surface of the cooling tank 200, a large amount of dew condensation water is generated. Particularly if the dew condensation water generated on the upper surface falls, the dew condensation water possibly enters the lid 112 of the reagent bottle 10. If this dew condensation water falls, enters the lid 112, and remains, the dew condensation water possibly enters the reagent bottle 10 to dilute the reagent with the dew condensation water when a hole is bored in the reagent bottle 10 by the needle 105.

As an example of a structure for avoiding the degradation of the reagent by the dew condensation water on the upper surface, in FIG. 16, the heat exchanger plates 201 on a surface 200A-side and an upper surface 200B-side of the cooling tank 200 are inclined with respect to a ground and disposed with a gradient formed toward a back surface. Furthermore, an IN-side of the cold water from the reagent disk 9 is set as a back surface side of the cooling tank 200 and an OUT-side of the cold water is set as a front surface side thereof. With this structure, during initial cold water filling, the cold water entering from the tube 207A efficiently pushes out air within the cooling tank 200 and discharges the air to the tube 207B, whereby water in the cooling tank 200 and in the tubes 207A and 207B can be substituted with the cold water. Furthermore, since the dew condensation water concentrates on the back surface, it is possible to efficiently discharge the dew condensation water into a drain 206 disposed on a back of the second cool box 110.

Here, it is desirable that the second cool box 110 is disposed so that the second cool box inner conveying surface 125 is horizontal to the ground and also horizontal to the first rail 123 and the second rail 124. This can bring advantages including those in that the reagent mounting unit 103 can smoothly operate and the reagent in the reagent bottle 10 is suppressed from frothing up during the operation of the reagent mounting unit 103.

Figure 17:
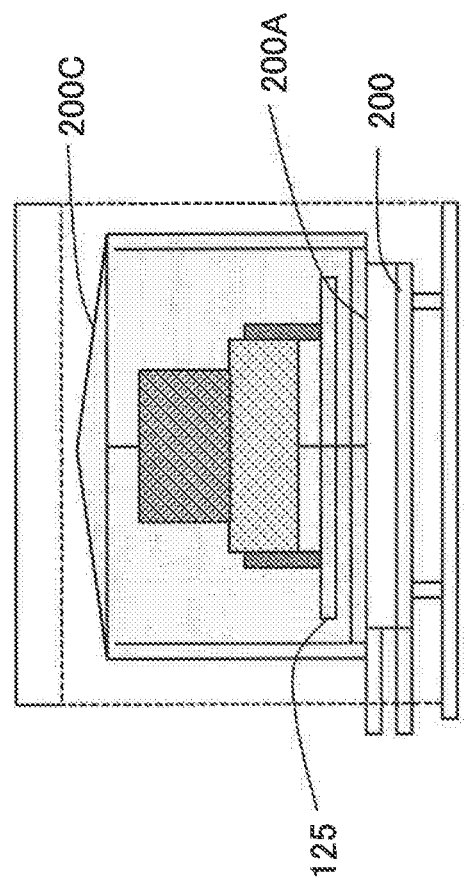
FIG. 17 is a schematic diagram explaining another example of the second cool box of the autoloader mechanism provided in the automatic analyzer according to the first embodiment of the present invention.

As shown in FIG. 17, the interior of the second cool box 110 can be structured to have inclinations on the upper surface 200C. With the structure described above, the dew condensation water does not fall directly beneath but falls along a side surface of the cooling tank 200. It is, therefore, possible to prevent adhesion of the dew condensation water on the reagent bottle 10 and increase a cooling area, thereby making it possible to improve cooling capability.

The entire interior of the second cool box 110 is covered with a heat insulating material 202 for enhancing a cold insulation capability.

The doors (the first door 203 and the second door 204) of the second cool box 110 are structured to be opened/closed to be interlocked with the longitudinal operation of the reagent mounting unit 103. The structure will not be described herein in detail. Alternatively, a configuration such that the doors are opened/closed using an actuator or the like can be adopted.

In FIG. 14 and the like, the packing is bonded to rear sides of the first door 203 and the second door 204 to improve hermeticity from the outside air. Alternatively, however, a packing may be bonded to a fixed side of the second cool box 110.

Figure 18:
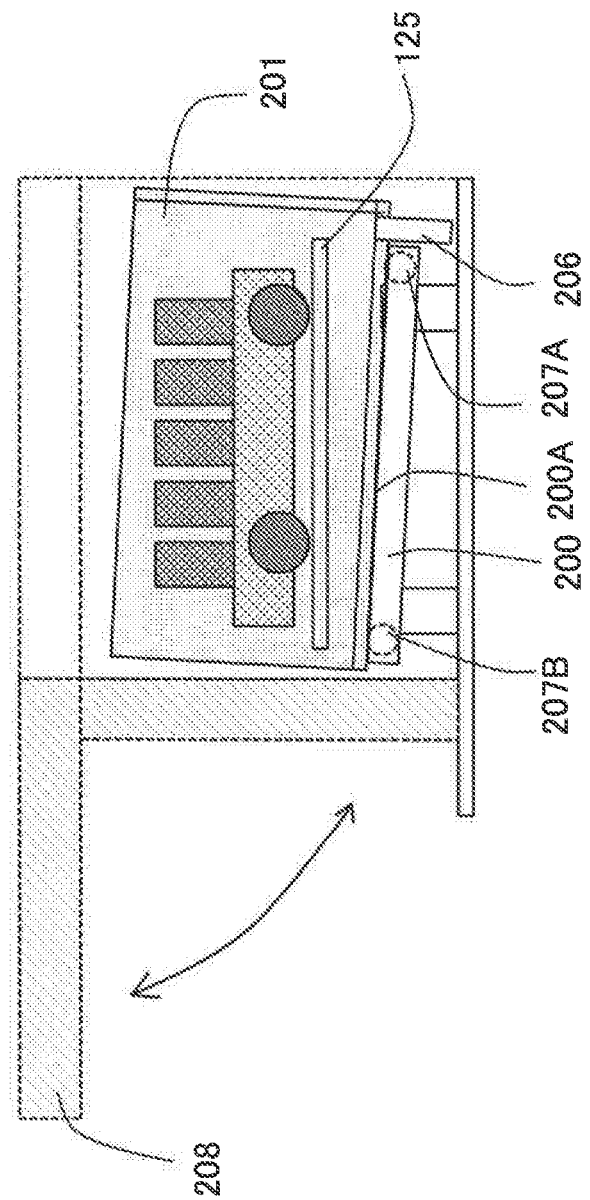
FIG. 18 is a schematic diagram explaining another example of the second cool box of the autoloader mechanism provided in the automatic analyzer according to the first embodiment of the present invention.
Figure 19:
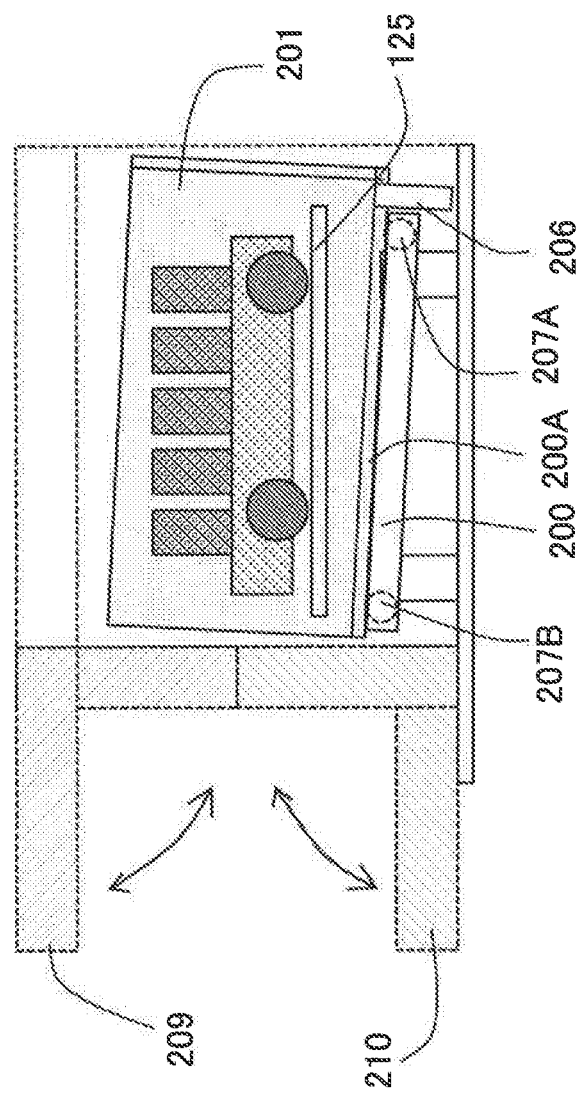
FIG. 19 is a schematic diagram explaining another example of the second cool box of the autoloader mechanism provided in the automatic analyzer according to the first embodiment of the present invention.

While an example of the doors that are opened/closed left and right is described in FIG. 14 and the like, one door shown in FIGS. 11 and 12 may be opened/closed, a structure of single door 208 that is opened/closed vertically as shown in FIG. 18 or a structure of two split doors (doors 209 and 210) that are opened/closed vertically as shown in FIG. 19 can be used. The arrangement of the door (doors) may be selected as appropriate so that the longitudinal operation of the reagent mounting unit 103 does not interfere with the operation of the reagent conveying mechanism 101.

Furthermore, while the two doors (doors 209 and 210) are shown to be generally equal in length in FIG. 19, lengths of the two doors may be changed. In this case, making the lower door (door 210) relatively longer than the upper door (door 209) enables the reagent conveying mechanism 101 to be closer to the second cool box 110.

In this connection, various forms of doors are present as described so far. When a door that opens downward is used, the second cool box 110 may be configured such that an auxiliary rail for stably moving the reagent mounting unit 103 is provided within the door.

Description of the main configuration of the autoloader mechanism is finished here.

Operations from installation of new reagent bottles 10 to loading thereof into the reagent disk 9 using the autoloader mechanism 100 will be described with reference to FIG. 20 and the like.

Figure 20:
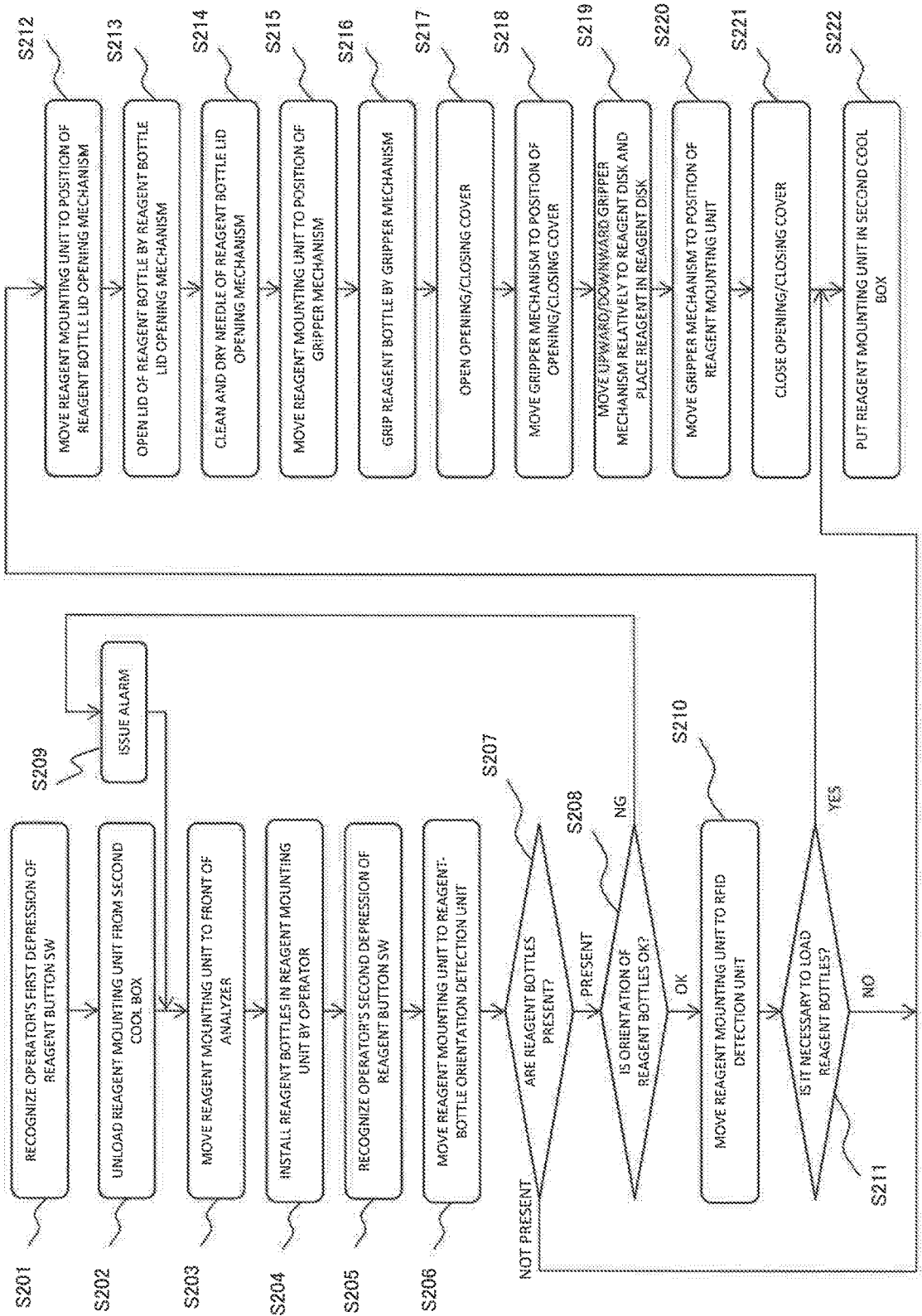
FIG. 20 is a flowchart explaining a reagent bottle loading operation in the automatic analyzer according to the first embodiment of the present invention.

In FIG. 20, when the operator is to load new reagent bottles 10 into the reagent disk 9, the operator depresses a reagent button switch (not shown) of the automatic analyzer first time. The analyzer recognizes the operator's first depression of the reagent button switch (Step S201). The reagent mounting mechanism 102 is thereby actuated, and the reagent mounting unit 103 is unloaded from the second cool box 110 (Step S202) and moves to the front of the automatic analyzer as shown in FIG. 10 (lower portion in FIG. 10) (Step S203).

Figure 8:
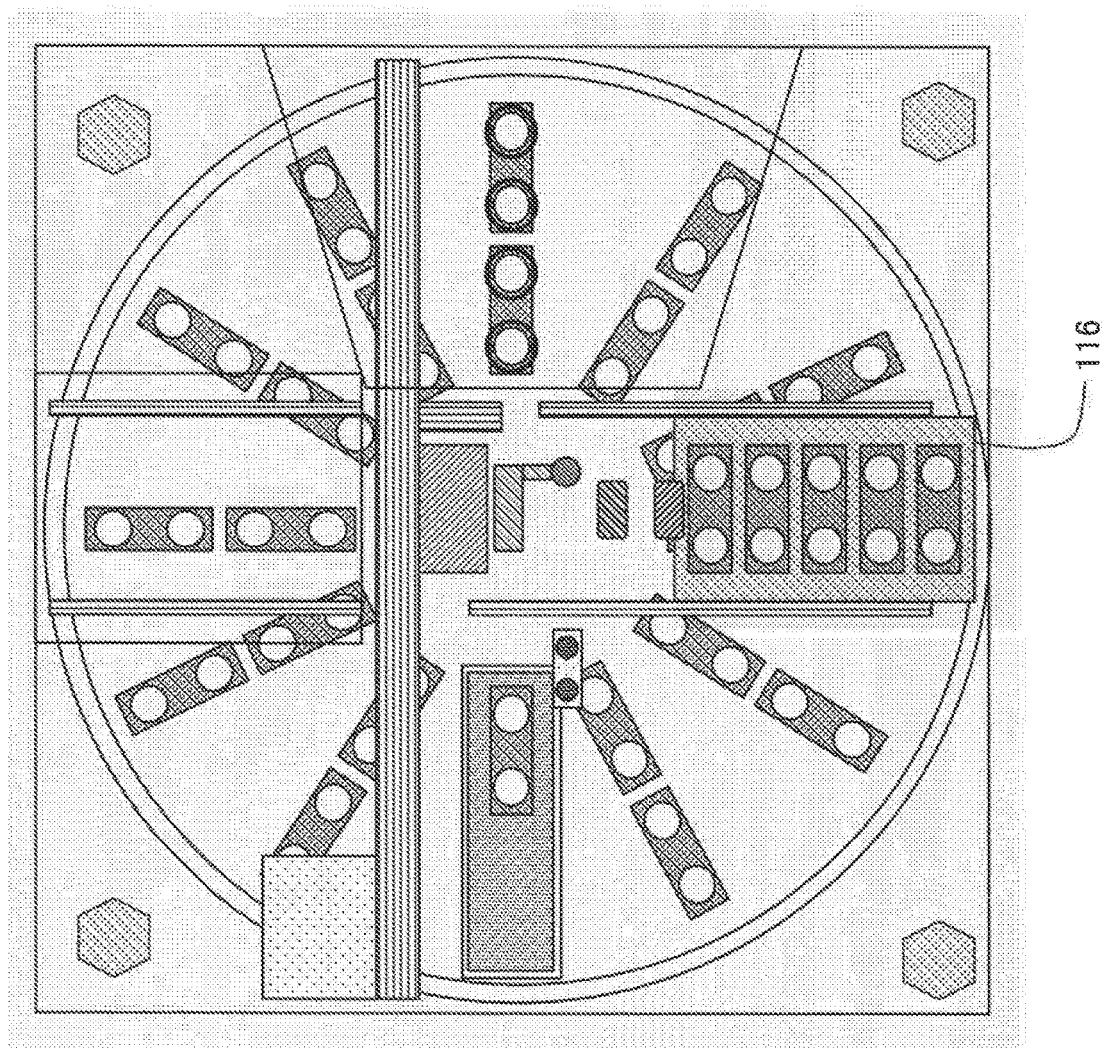
FIG. 8 is a schematic diagram explaining an example of operations of the autoloader mechanism provided in the automatic analyzer according to the first embodiment of the present invention.

As shown in FIG. 8, after arrival of the reagent mounting unit 103 on the front of the automatic analyzer, the interlocking mechanism of the cover 116 is released. The operator then opens the cover 116 and installs the reagent bottles 10 in the reagent mounting unit 103 (Step S204). After installing a necessary number of reagent bottles 10 in the reagent mounting unit 103, the operator closes the cover 116 and re-depresses the reagent button switch. The automatic analyzer recognizes operator's second depression of the reagent button switch (Step S205).

For the convenience of description, the operation in a case in which the reagent mounting unit 103 has a structure such that five reagent slots in which the reagents can be installed are present, and the operator installs the reagent bottles 10 in front and rear reagent slots of the reagent mounting unit 103 while the three reagent slots between the front and rear reagent slots are empty will be described.

After the operator's depression of the button switch is recognized, the reagent mounting unit 103 is driven to pass through a lower portion of the bottle orientation detecting sensor 114 (Step S206). At this time, the bottle orientation detecting sensor 114 determines whether the reagent bottles 10 are installed by measuring the installation direction of the reagent bottles 10 and whether the reagent bottles 10 are installed sequentially from the reagent bottle 10 installed on a back side in FIG. 10 to the reagent bottle 10 installed on a front side in FIG. 10 (Step S207). When it is determined that the reagent bottles 10 are installed, a process proceeds to Step S208. When it is determined that the reagent bottles 10 are not installed, the process proceeds to Step S222.

Next, the installation direction of the reagent bottles 10 is determined (Step S208). When it is determined that the reagent bottles 10 are correctly installed (OK), the process proceeds to Step S210. When it is determined that the reagent bottles 10 are not correctly installed (NG), the process proceeds to Step S209. Examples of a method of determining the installation direction of the reagent bottles 10 include a method including sticking a white-and-black label on each reagent bottle 10 and determining directions of white and black by means of a sensor. Alternatively, it can be determined whether the reagent bottles 10 are present by, for example, disposing a reflection sensor or a beam sensor and determining whether light is shielded.

When it is determined that the installation direction of the reagent bottles 10 is opposite in Step S208, then the automatic analyzer issues an alarm, the reagent mounting unit 103 moves to the front of the automatic analyzer, and the interlocking mechanism of the cover 116 is released, thereby alerting the operator (Step S209). It is assumed that the operator is not aware of the alarm despite alerting the operator by the alarm. In this case, it is assumed that the reagent bottles 10 installed in the reagent mounting unit 103 are left uncontrolled in the atmosphere to cause the degradation of the reagent. Therefore, after passage of certain time, it is desirable to return the reagent mounting unit 103 into the second cool box 110 in a state of keeping the alarm active. Alternatively, a correction mechanism that automatically corrects the installation direction of the reagent bottles 10 may be provided to allow the correction mechanism to automatically correct the installation direction.

Next, the reagent mounting unit 103 moves to the RFID detection unit, causes the RFID sensor 115 to read information about the RFID tag 10a of each reagent bottle 10, and obtains information about the reagent in the reagent bottles 10 (Step S210).

It is noted that an installation interval at which the bottle orientation detecting sensor 114 and the RFID sensor 115 are installed may be set equal to the installation length between the reagent bottles 10 in the reagent mounting unit 103 to simultaneously implement detection by the bottle orientation detecting sensor 114 and measurement by the RFID sensor 115. Alternatively, the bottle direction and whether the reagent bottles 10 are installed are detected first and then only portions where the reagent bottles 10 are installed may be measured by the RFID sensor 115. In another alternative, the bottle orientation detecting sensor 114 and the RFID sensor 115 may be disposed at the same position so that detection of the direction of the reagent bottles 10 installed in the reagent mounting unit 103 and measurement of the information about the reagent bottles 10 may be implemented either simultaneously or sequentially.

In the description given so far, the operations of the autoloader mechanism 100 do not disturb the analysis operations even when the automatic analyzer is on standby or measuring the analyte, so that the operations of the autoloader mechanism 100 is identical between when the automatic analyzer is on standby and when the autoloader mechanism is measuring the analyte.

The automatic analyzer determines whether it is necessary to load the reagent bottles 10 into the reagent disk 9 on the basis of the information obtained in Step S210 (Step S211). When it is determined that it is necessary to load the reagent bottles 10, the process proceeds to Step S212. When it is determined that it is not necessary to load the reagent bottles 10, the process proceeds to Step S222.

Figure 21:
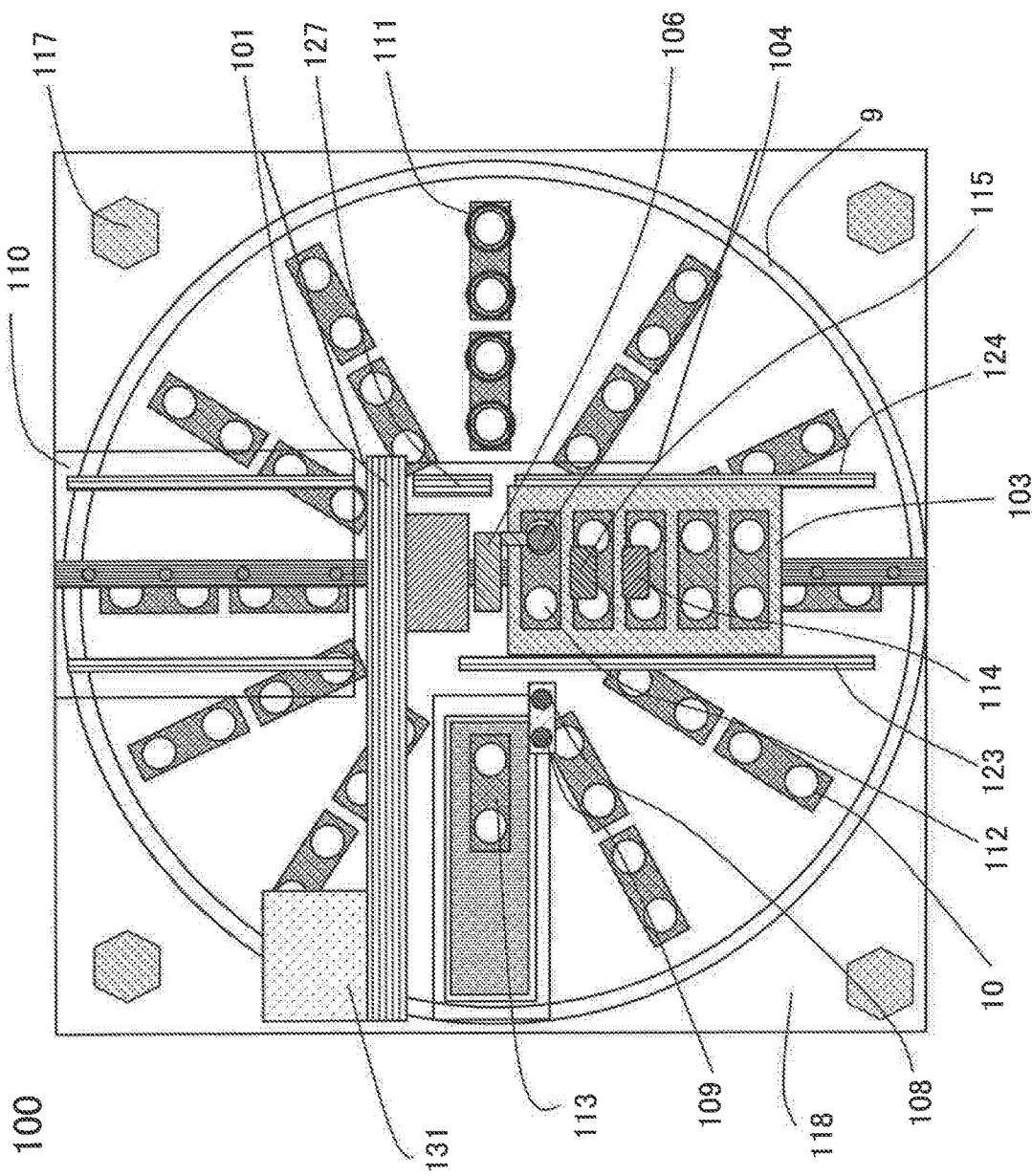
FIG. 21 is a schematic diagram explaining an example of operations of the autoloader mechanism provided in the automatic analyzer according to the first embodiment of the present invention.

When it is determined that it is necessary to load the reagent bottles 10 in Step S211, the reagent mounting unit 103 moves to a position below the reagent bottle lid opening mechanism 104 as shown in FIG. 21 (Step S212).

Next, the reagent bottle lid opening mechanism 104 moves downward toward the lid 112 of one of the reagent bottles 10 and an incision is made in the lid 112 by the needle 105 to such a degree that the reagent probe 7a or 8a can be inserted into the incision (Step S213).

After the incision is made in the lid 112, then the reagent bottle lid opening mechanism 104 moves upward, the reagent conveying mechanism 101 moves to a position of the needle cleaning tank 108 to clean the needle 105, and the needle 105 is cleaned. The reagent conveying mechanism 101 moves to the needle drying port 109 to carry out drying of the needle 105. Subsequently, an incision is similarly made in the lid 112 of the second reagent bottle 10 to clean and dry the needle 105 (step S214). While the number of caps 112 is described as two in the first embodiment, a similar procedure is carried out when the number of caps 112 is two or more.

Figure 22:
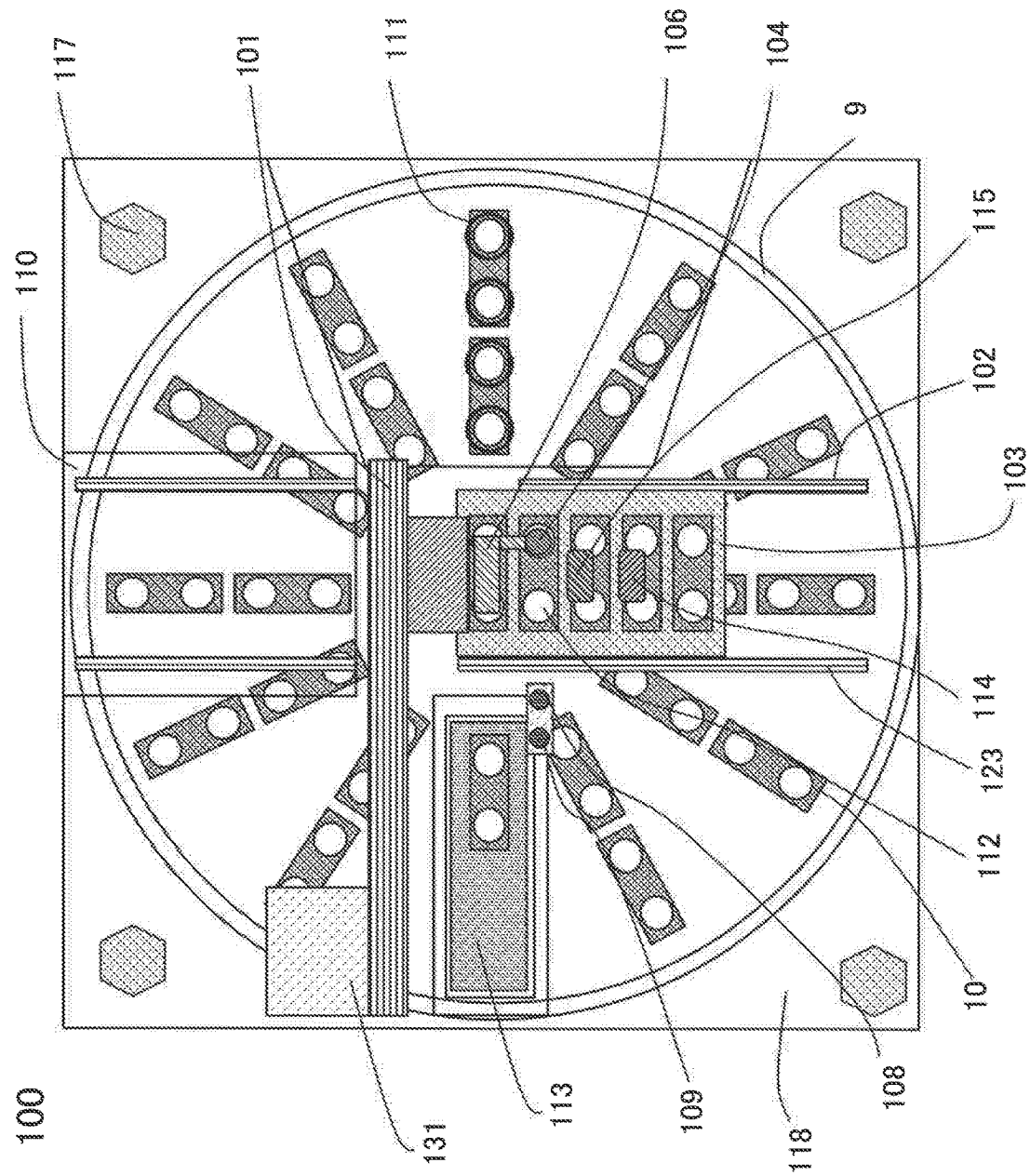
FIG. 22 is a schematic diagram explaining an example of operations of the autoloader mechanism provided in the automatic analyzer according to the first embodiment of the present invention.

After drying, the reagent conveying mechanism 101 moves again the reagent mounting unit 103 to the position below the gripper mechanism 106 (Step S215). Specifically, as shown in FIG. 22, the reagent mounting mechanism 102 causes the reagent mounting unit 103 to operate and the incised reagent bottles 10 are each moved to the position below the gripper mechanism 106.

Thereafter, the gripper mechanism 106 moves downward and grips the reagent bottle 10 (Step S216), and the opening/closing cover 113 is opened (Step S217). The gripper mechanism 106 moves upward generally at the same timing as that of Step S217 and moves to the position of the opened opening/closing cover 113 (Step S218). The gripper mechanism 106 loads the gripped reagent bottle 10 in an empty position of the reagent disk 9 as shown in FIG. 21 (Step S219). After loading, the gripper mechanism 106 is returned again to the position 106B of gripping the reagent bottle 10 (Step S220). In addition, the opening/closing cover 113 is closed generally simultaneously with or in parallel to Step S220 (Step S221).

It is noted that in order to carry out the operation of Step S220 during an operation, it suffices to secure moving time of the vertical operation by the gripper mechanism 106. Therefore, only one cycle is allotted to an operation of loading the reagent bottle 10 into the reagent disk 9. This can reduce an influence of the operation of loading the reagent bottle 10 on the operation and thus minimize the influence thereof on a processing speed.

Figure 23:
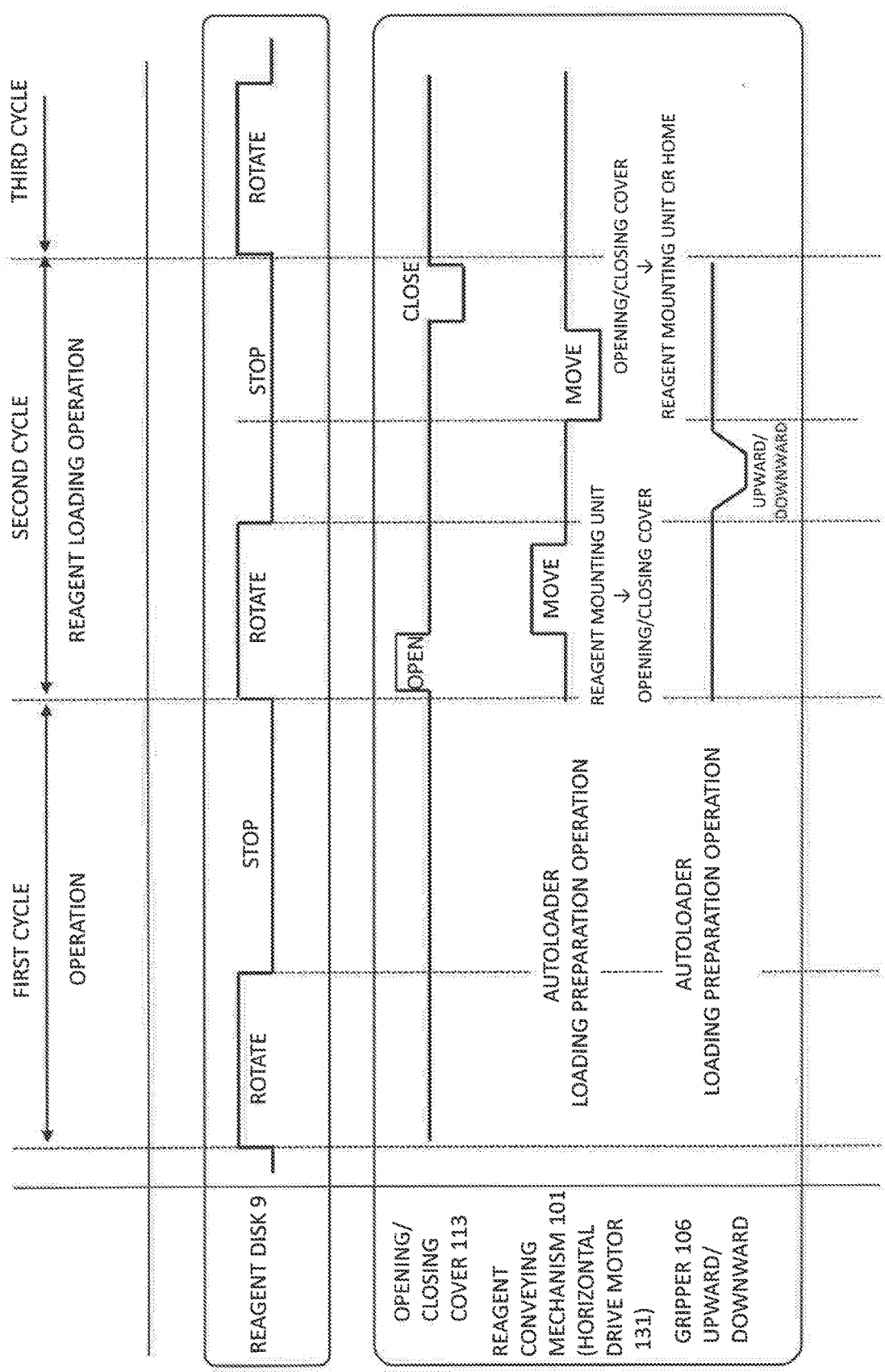
FIG. 23 is a sequence diagram of analysis in the automatic analyzer according to the first embodiment of the present invention.

A timing chart in a case of allotting only one cycle of this to the operation of loading the reagent bottle 10 into the reagent disk 9 will be described with reference to FIG. 23. FIG. 23 is an analysis timing chart, where it is assumed that a first cycle is allotted to an operation, a second cycle is allotted to the operation of loading the reagent bottle 10, and third and following cycles are allotted to ordinary operations.

First, in the first cycle, the reagent disk 9 is rotated and stopped to dispense a reagent necessary for analysis during the analysis operations. In this cycle, a loading preparation operation of the autoloader mechanism 100 is carried out, that is, the opening/closing cover 113 is not opened/closed, the reagent conveying mechanism 101 does not operate, and the gripper mechanism 106 does not operate vertically.

In the second cycle, the operation of loading the reagent bottle 10 is carried out, that is, the opening/closing cover 113 is opened while rotating the reagent disk 9 so that a portion into which the reagent bottle 10 is to be loaded is present below the opening/closing cover 113. In addition, in the second cycle, the gripper mechanism 106 grips the reagent bottle 10 to be loaded and in that state, the horizontal drive motor 131 is actuated to move the gripper mechanism 106 toward an upper surface side of the opening/closing cover 113. The opening/closing cover 113 may be opened during a stop operation of the reagent disk 9 in the first cycle. The gripper mechanism 106 is then moved vertically to load the reagent bottle 10 into the reagent disk 9. After end of loading, the gripper mechanism 106 is moved upward. After end of moving upward, the gripper mechanism 106 is moved from an upper surface position of the opening/closing cover 113 to either an upper surface side of the reagent mounting unit 103 or to the home position. Furthermore, the opening/closing cover 113 is closed while the reagent conveying mechanism 101 is moved.

Subsequently, the analysis operation is executed in the third cycle.

Exercising such control enables the gripper mechanism 106 to complete the operation from arrival on the opening/closing cover 113 until completion with loading of the reagent bottle 10 into the reagent disk 9 in one cycle.

Moreover, when a plurality of reagent bottles 10 are installed in the reagent mounting unit 103 and one of the reagent bottles 10 is loaded into the reagent disk 9, the reagent mounting unit 103 is controlled to quickly return into the second cool box 110 after the gripper mechanism 106 grips the reagent bottle 10 after the operation of Step S216 in FIG. 20. It is thereby possible to minimize degradation of the reagent and minimize the release of the cold air in the second cool box 110 to outside the cool box 110. "Quickly" means herein that the reagent mounting unit 103 returns before, for example, the reagent bottle 10 gripped by the gripper mechanism 106 is loaded into the reagent disk 9.

When the reagent bottle 10 is loaded into the reagent disk 9 during measurement of the automatic analyzer, it is desirable to provide means, for example, for delaying sample suction timing by one cycle and to provide an empty cycle so that the reagent conveying mechanism 101 can access the reagent disk 9. This can achieve replacement of the reagent bottle 10 only with temporal loss corresponding to the empty cycle while the processing speed is kept.

Operations of Steps S215 to S221 described so far are repeatedly performed on all the reagent bottles 10 mounted in the reagent mounting unit 103 and necessary to load into the reagent disk 9. As in Step S221, the opening/closing cover 113 is opened/closed for every access as needed, thereby preventing leakage of the cold air in the reagent disk 9 and effectively cold insulating the reagent.

When all the reagent bottles 10 installed in the reagent mounting unit 103 and necessary to load are loaded into the reagent disk 9, when the reagent bottle 10 determined to be unnecessary to load into the reagent disk 9 in Step S211 is present, or when it is determined in Step S207 that the reagent bottles 10 are not at all installed in the reagent mounting unit 103, the reagent mounting unit 103 along with the reagent bottles 10 installed therein is returned into the second cool box 110 and cold insulated in the second cool box 110 (Step S222).

Furthermore, the reagent bottle 10 cold insulated in the second cool box 110 in Step S222 is subjected to the processing corresponding to Steps S212 to S221, that is, making an incision in the lid 112 by the reagent bottle lid opening mechanism 104 and then loading the reagent bottle 10 into the reagent disk 9 by the gripper mechanism 106 at timing at which the reagent bottle 10 becomes necessary.

Figure 24:
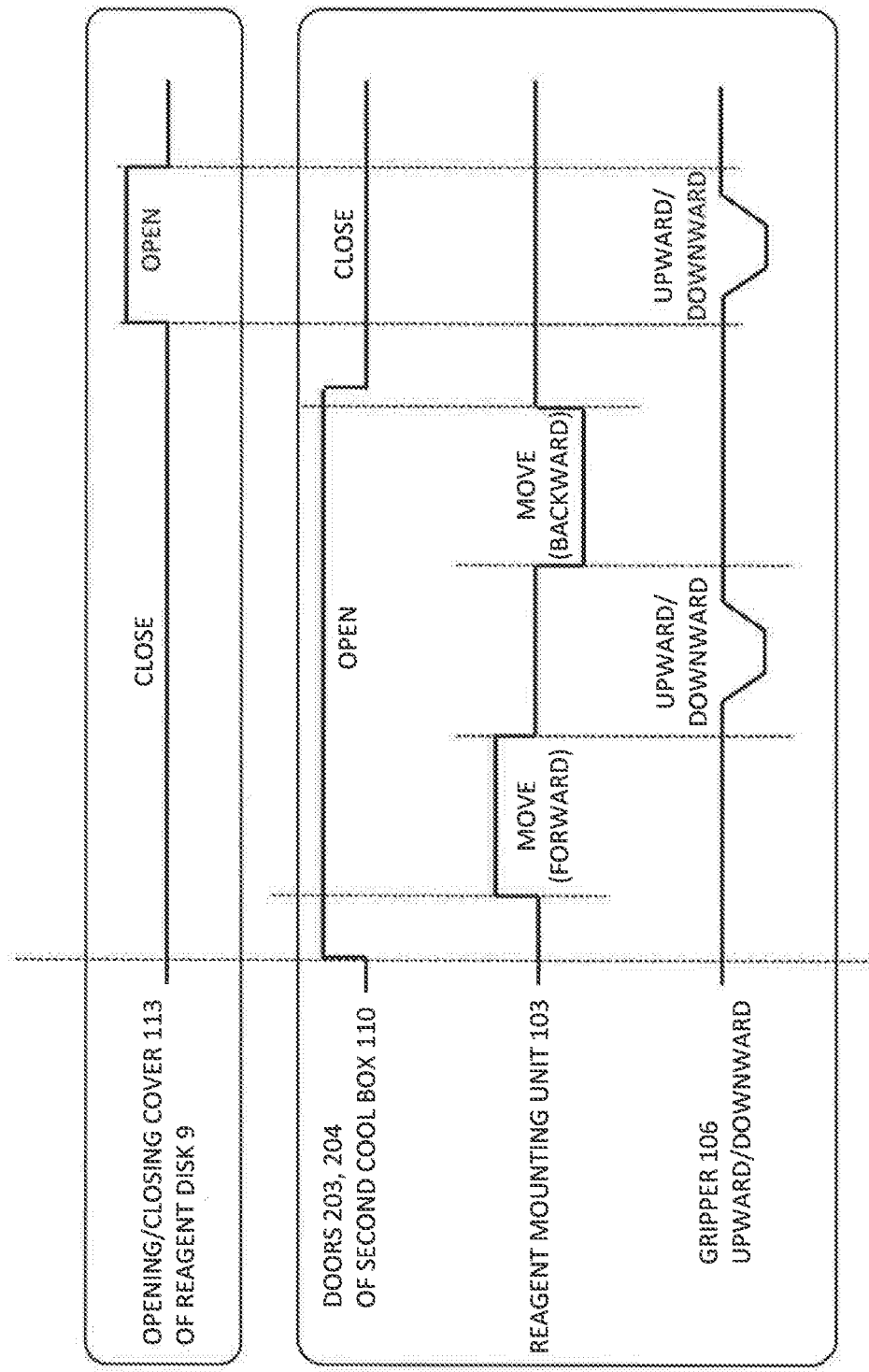
FIG. 24 is a sequence diagram of an example of reagent bottle loading in the automatic analyzer according to the first embodiment of the present invention.

In this case, as shown in FIG. 24, the first door 203 and the second door 204 of the second cool box 110 remain opened until the reagent mounting unit 103 exits from within the second cool box 110 and is stopped at the position 106B at which the gripper mechanism 106 grips the reagent bottle 10 (moving step) and the gripper mechanism 106 finishes gripping the reagent bottle 10 (gripping step).

Moreover, after the gripper mechanism 106 grips the reagent bottle 10 to correspond to Step S216 and then moves upward, the reagent mounting unit 103 promptly returns into the second cool box 110 before the gripper mechanism 106 starts a downward operation for loading the reagent bottle 10 into the reagent disk 9 at the latest. In this way, since the reagent mounting unit 103 promptly returns into the second cool box 110, cold insulation of another reagent bottle 10, when mounted in the reagent mounting unit 103, can be promptly started and the degradation of the reagent can be, therefore, suppressed.

Figure 25:
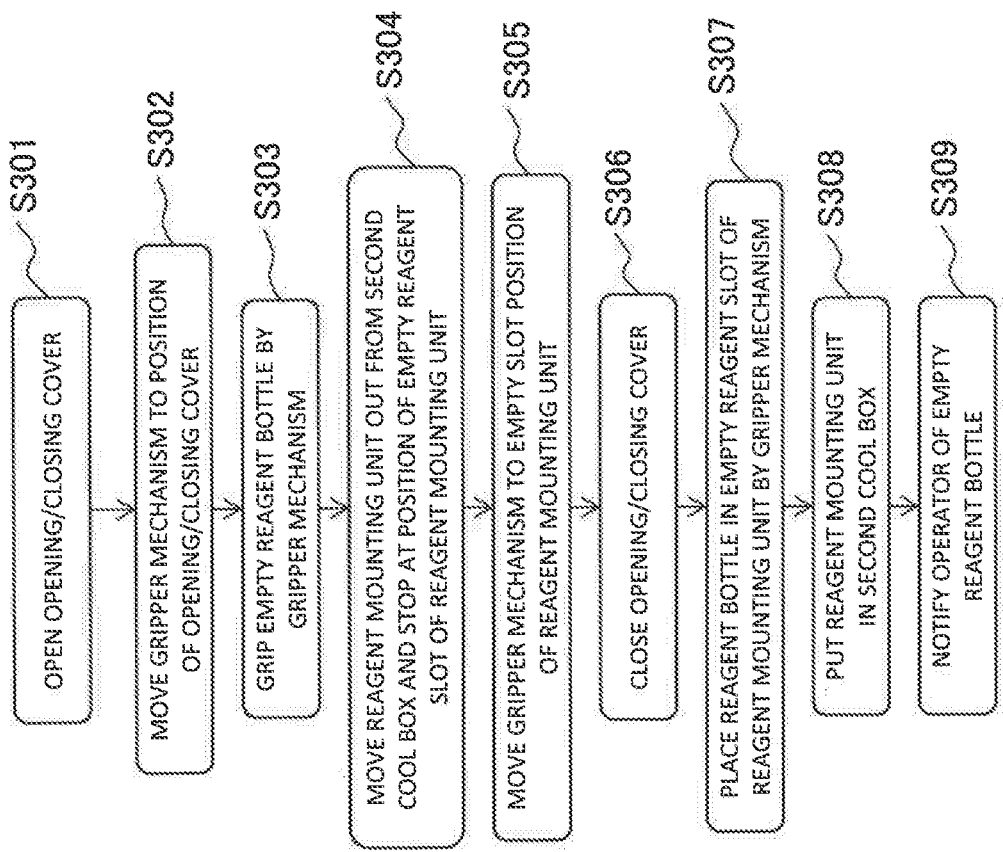
FIG. 25 is a flowchart explaining a reagent bottle unloading operations in the automatic analyzer according to the first embodiment of the present invention.

When the reagent bottle 10 installed in the reagent disk 9 is unloaded from the automatic analyzer, the operation is basically opposite to the operation for loading and the reagent bottle 10 is unloaded in accordance with, for example, a flow of FIG. 25. Timing of unloading the reagent bottle 10 as shown in FIG. 25 may be during analysis, after end of last dispensing, or after output of an analysis result. In a case of unloading the reagent bottle 10 during the analysis, it is desired that the gripper mechanism 106 unloads the reagent bottle 10 from the reagent disk 9 and ends moving upward in one cycle, similarly to the case of loading the reagent bottle 10.

In FIG. 25, the reagent conveying mechanism 101 first opens the opening/closing cover 113 (Step S301). Furthermore, the gripper mechanism 106 moves to the position of the opened opening/closing cover 113 (Step S302).

Next, the gripper mechanism 106 grips the empty reagent bottle 10 (Step S303). In parallel to this, the reagent mounting unit 103 moves to outside of the second cool box 110, and moves and is stopped so that a position of an empty reagent slot is located below the operating direction 106A in which the gripper mechanism 106 conveys the reagent bottle 10 to the opening/closing cover 113 (Step S304).

Next, the reagent conveying mechanism 101 moves to the position 106B at which the gripper mechanism 106 grips the empty reagent bottle 10 in a state in which the gripper mechanism 106 grips the reagent bottle 10 (Step S305). In parallel to this, the opening/closing cover 113 is closed (Step S306).

The gripper mechanism 106 then places the empty reagent bottle 10 in the empty reagent slot of the reagent mounting unit 103 (Step S307). The reagent mounting unit 103 then returns to the second cool box 110 (Step S308).

The operator is then notified that the empty reagent bottle 10 is in a state of being unloaded (Step S309). Upon receiving this notification, the operator moves the reagent mounting unit 103 to the position of the cover 116 to unload the empty reagent bottle 10 outside from the automatic analyzer.

Figure 27:
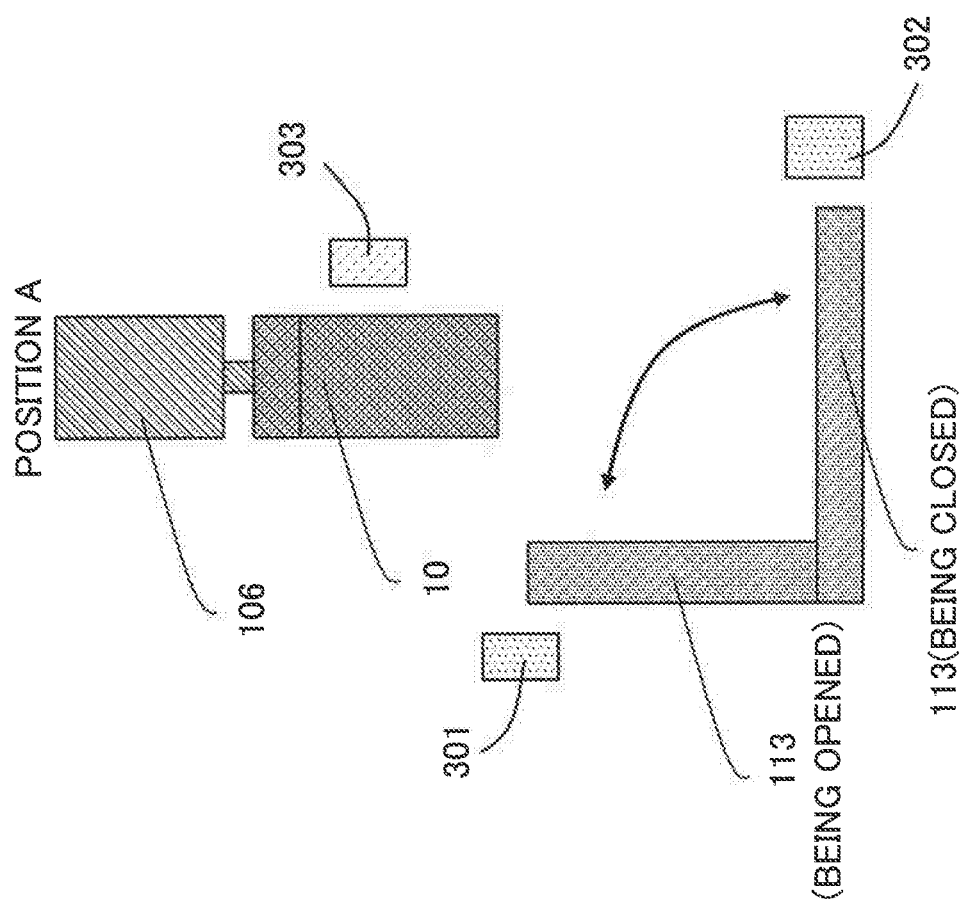
FIG. 27 shows a position relationship among a gripper mechanism, an opening/closing cover, and a reagent bottle viewed in a direction from a side surface of a reagent disk to a center of the disk during loading and unloading of the reagent bottle in the automatic analyzer according to the first embodiment of the present invention.
Figure 28:
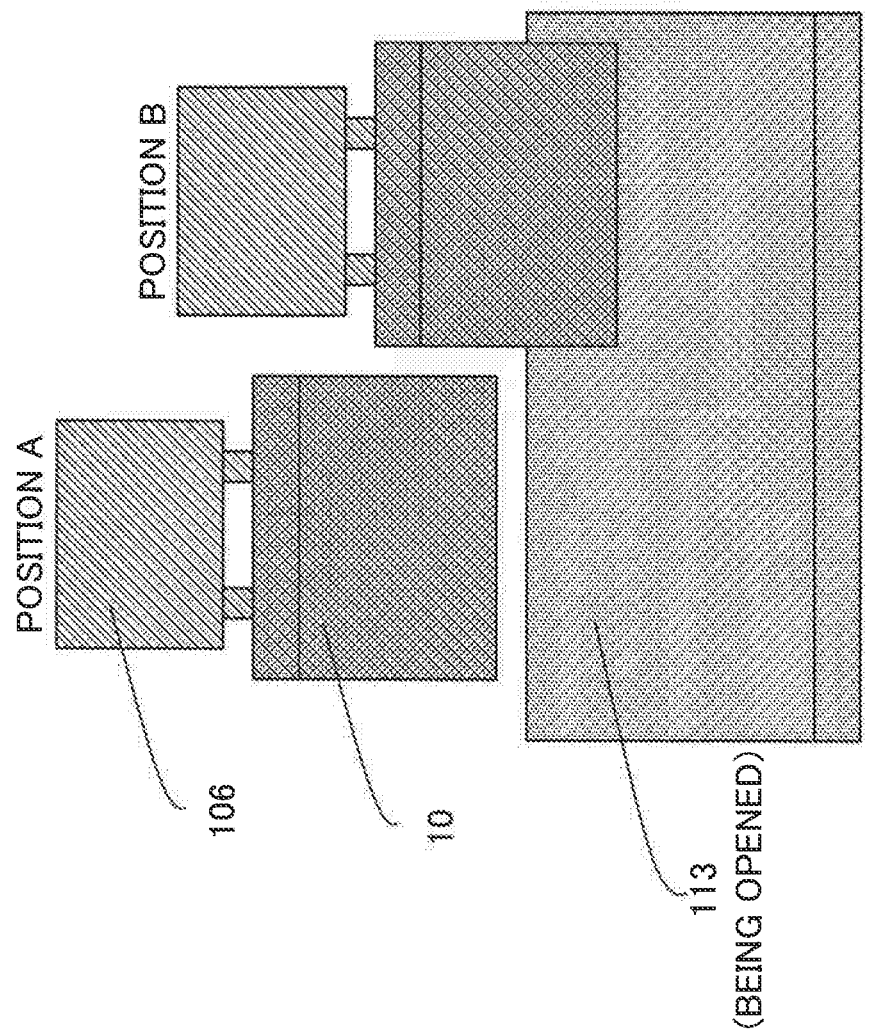
FIG. 28 shows a position relationship among the gripper mechanism, the opening/closing cover, and the reagent bottle viewed in a direction from the side surface of the reagent disk to a tangent of the disk during loading and unloading of the reagent bottle in the automatic analyzer according to the first embodiment of the present invention.

The gripper mechanism 106 and the opening/closing cover 113 actuated horizontally by the horizontal drive motor 131 of the reagent conveying mechanism 101 will now be describe with reference to FIGS. 27 and 28. FIGS. 27 and 28 show a position relationship among the gripper mechanism 106, the opening/closing cover 113, and the reagent bottle 10 when the reagent bottle 10 is unloaded from the reagent disk 9 and when the reagent bottle 10 is loaded into the reagent disk 9, respectively.

FIG. 27 shows the gripper mechanism 106 and the opening/closing cover 113 viewed from laterally (shows the reagent disk viewed in a direction from a side surface thereof to a center of the disk), and FIG. 28 shows the gripper mechanism 106 and the opening/closing cover 113 viewed from the front (shows the reagent disk viewed in a direction from a side surface thereof to a tangent of the disk). FIG. 27 shows that the opening/closing cover 113 covers the reagent disk when the opening/closing cover 113 is closed, and that the cover is opened upward and rises generally vertically when the opening/closing cover 113 is opened. FIG. 28 shows positions A and B and shows that both of the positions A and B indicate that the gripper mechanism 106 rises up to an upper limit point.

A difference between the positions A and B in FIG. 28 is a height of the upper limit point. The position A is a height at which a bottom surface of the reagent bottle 10 is located above an upper end of the opening/closing cover 113 when the opening/closing cover 113 is opened. By contrast, the position B is a height at which the bottom surface of the reagent bottle 10 is located below the upper end of the opening/closing cover 113 when the opening/closing cover 113 is opened.

When the position A is assumed as the upper limit point of the gripper mechanism 106, the opening/closing cover 113 can be opened/closed after the gripper mechanism 106 moves the reagent bottle 10 to a loading (unloading) position. In other words, at the position of FIG. 27, the opening/closing cover 113 can be opened/closed without interfering with the reagent bottle 10 gripped by the gripper mechanism 106. Therefore, there is an advantage in that no restriction is imposed on an order of an operation of moving the reagent bottle 10 to the loading (unloading) position (operation of moving to the position A) and an operation of opening/closing the opening/closing cover 113.

On the other hand, when the position B is assumed as the upper limit point of the gripper mechanism 106, the opening/closing cover 113 can be opened/closed at a position which is deviated from the position B in the horizontal direction and at which the gripper mechanism 106 is located. In other words, at the position B, the opening/closing cover 113 interferes with the reagent bottle 10. Owing to this, it is necessary to close the opening/closing cover 113 after the gripper mechanism 106 moves to the position deviated from the position B in the horizontal direction, or to open the opening/closing cover 113 before the gripper mechanism 10 moves to the position B. Albeit this restriction, it is possible to make the automatic analyzer compact since the reagent conveying mechanism 101 can be made close to the reagent disk 9. Furthermore, when a vertical moving speed of the reagent bottle 10 is the same, it is possible to shorten vertical moving time of the reagent bottle 10 or the gripper mechanism 106 to correspond to a shorter moving distance. It is eventually possible to shorten time of loading or unloading the reagent bottle 10. It is noted that the upper limit point used herein may not be always an uppermost position but refers to a position when the gripper mechanism 106 moves in the horizontal direction.

As shown in FIG. 27, an opening recognition sensor 301 that detects that the opening/closing cover 113 is completely opened and a closing recognition sensor 302 that detects that the opening/closing cover 113 is completely closed are provided around the opening/closing cover 113. In addition, the reagent conveying mechanism 101 is equipped with a reagent bottle presence/absence confirmation sensor 303 that detects whether the gripper mechanism 106 grips the reagent bottle 10.

Advantages of the first embodiment will next be described.

In the first embodiment described above, the reagent mounting mechanism (conveying line) 102 is disposed between the reagent probe suction port 111 and the opening/closing cover 113, the reagent mounting unit 103 is actuated near a center of a space above the reagent disk 9, and the second cool box 110 cold insulating the reagent bottles 10 and different from the reagent disk 9 is provided on one end of the linear guide 119. Therefore, the autoloader mechanism 100 is disposed in a central portion of the reagent disk 9 above the reagent disk 9, the autoloader mechanism 100 can be disposed so that the operating range of the autoloader mechanism 100 concentrate above the reagent disk 9 using the space that is not conventionally used, and an installation area of the autoloader mechanism 100 can fall within in the automatic analyzer. Owing to this, a function of automatically installing the reagent bottles 10 in the reagent disk 9 can be installed without changing a gross floor area from that of a conventional analyzer configuration. Furthermore, even while the automatic analyzer is measuring the patient analyte, it is possible to keep a measurement delay to a minimum, and load a new reagent bottle 10 into the reagent disk 9 before a remaining amount of the reagent installed in the reagent disk 9 of the automatic analyzer becomes small. Moreover, since the autoloader mechanism 100 operates in a compact fashion in the operating range that is only on the reagent disk 9 within the automatic analyzer, unnecessary moving distances of the mechanisms are eliminated and operation efficiently can be improved. In other words, throughput is improved and time for loading the reagent bottle 10 can be shortened. Therefore, it is possible to achieve saving of a mechanism installation space and reduction of the number of constituent components, and alleviate an operator's burden.

Furthermore, the first door 203 and the second door 204 of the second cool box 110 remain opened since the reagent mounting unit 103 exits from within the second cool box 110 and is stopped at the position 106B at which the gripper mechanism 106 grips the reagent bottle 10 until the gripper mechanism 106 finishes gripping the reagent bottle 10. An operation of opening the first door 203 and the second door 204 is not thereby carried out when the reagent mounting unit 103 returns into the second cool box 110. Therefore, it is possible to exhibit advantages in that the reagent bottle 10 can be quickly cold insulated again and cold insulation efficiency is improved, compared with a case in which the reagent mounting unit 103 waits outside of the second cool box 110 until the doors are opened, and in that the degradation of the reagent can be suppressed, compared with a conventional automatic analyzer.

Moreover, the operating direction 106A in which the gripper mechanism 106 conveys the reagent bottle 10 to the opening/closing cover 113 is orthogonal to the installation direction 119A of the reagent mounting mechanism 102, and the position at which the gripper mechanism 106 grips the reagent bottle 10 installed in the reagent mounting unit 103 is the position 106B that is the intersecting point with the reagent mounting mechanism 102. Therefore, it is possible to dispose the reagent mounting unit 103 and the reagent conveying mechanism 101 without excessively providing drive units and without interference therebetween, achieve more efficient operations, and further improve work efficiency. In the first embodiment, the reagent mounting mechanism 102 is described as the conveying line for moving the reagent mounting unit 103 between the installation position at which the operator installs the reagent bottle 10 in the reagent mounting unit 103 and the second cool box 110 by way of example. According to the example of the reagent mounting mechanism 102, the operating direction 106A of the gripper mechanism is orthogonal to the installation direction 119A of the linear guide 119, and the position 106B is the intersecting point between the operating direction 106A of the gripper mechanism and the linear guide 119.

Furthermore, the position 106B at which the gripper mechanism 106 grips the reagent bottle 10 is closer to the second cool box 110 than the tip end position 204A of the second door 204 of the second cool box 110 when the second door 204 is opened to a maximum angle. It is thereby possible to reduce an operation distance of the reagent mounting unit 103 when the gripper mechanism 106 grips the reagent bottle 10 on the reagent mounting unit 103, and reduce an operation distance of the reagent mounting unit 103 when the reagent mounting unit 103 returns into the second cool box 110. Eliminating waste in the moving distances of the mechanisms can further improve the operation efficiency. Moreover, the reagent mounting unit 103 can be made long since a depth of the second cool box 110 can be set large, so that many reagent bottles 10 can be placed in the reagent mounting unit 103.

Furthermore, configuring the first door 203 and the second door 204 with the two doors that are hinged double doors can improve hermeticity of the second cool box 110, and can further improve a cold insulation state of the reagent bottles 10 in the second cool box 110.

Moreover, out of the two doors, the second door 204 closer to the reagent probe suction port 111 is longer than the first door 203 closer to the opening/closing cover 113 which is a side on which the gripper mechanism 106 mainly operates. Owing to this, even in a state of opening the first door 203 and the second door 204, the gripper mechanism 106 can easily access the reagent bottle 10 on the reagent mounting unit 103 at a short moving distance, thus enabling further saving of the mechanism installation space and further reduction of the number of constituent components.

Furthermore, the reagent conveying mechanism 101 is disposed in such a manner that the operating direction 106A of the gripper mechanism 106 passes through the rotation center 9A of the reagent disk 9. Owing to this, when the reagent bottle 10 is loaded or unloaded into/from the reagent disk 9, the gripper mechanism 106 does not need to move in directions other than the horizontal direction, which enables the gripper mechanism 106 to quite easily access the reagent bottle 10. Eliminating waste in the moving distance can further improve the operation efficiency.

Configuring, in particular, the reagent mounting mechanism 102 to include the linear guide 119, the first rail 123, and the second rail 124 enables realization of the stable operation of the reagent mounting unit 103.

Moreover, providing the gaps 126A and 126B between the first and second rails 123 and 124 and the second cool box inner conveying surface 125 of the reagent mounting unit 103 of the second cool box 110 can make quite simple an opening/closing configuration of the doors of the second cool box 110 and enables stable cold insulation of the interior of the second cool box 110.

Furthermore, the auxiliary rail 127 is provided inside of the second door 204 or the third door 205 for burying the gap 126B between the second rail 124 and the second cool box inner conveying surface 125. Owing to this, even when the gap 126B is present, the reagent mounting unit 103 smoothly operates on the second rail 124, thus enabling more stable operation.

Moreover, the gripper mechanism 106 is controlled to complete the operation from arrival on the opening/closing cover 113 until completion with loading the reagent bottle 10 into the reagent disk 9 in one cycle. It is thereby possible to minimize the influence the operation on the processing speed.

Furthermore, the reagent mounting unit 103 returns into the second cool box 110 after the gripper mechanism 106 grips the reagent bottle 10 and before the gripper mechanism 106 loads the gripped reagent bottle 10 into the reagent disk 9. Therefore, it is possible to keep the degradation of the reagent bottle 10 installed in the reagent mounting unit 103 waiting for loading into the reagent disk 9 to a minimum and further reduce the influence on an analysis result.

Moreover, the operation from installation of the reagent bottle 10 in the reagent mounting unit 103 until opening the reagent bottle 10 is actuated independently without synchronization with analysis operations. Similarly, it is possible to minimize the influence on the processing speed.

Furthermore, the reagent mounting unit 103, the second cool box 110, the reagent conveying mechanism 101, and the reagent mounting mechanism 102 are disposed on the metallic plate 118 provided on the reagent disk 9. The autoloader mechanism 100 can be thereby collectively disposed on the reagent disk 9, and the autoloader mechanism 100 can be disposed on the reagent disk 9 with a simple configuration.

Moreover, the metallic plate 118 is disposed on the reagent disk 9 by being supported by the struts 117 disposed on the outer circumference of the reagent disk 9. The metallic plate 118 can be thereby disposed on the reagent disk 9 with a simple structure, and the autoloader mechanism 100 can be similarly disposed on the reagent disk 9 with a simple configuration.

The plate 129 is provided between the metallic plate 118 and the reagent disk 9, and the metallic plate 118 is disposed on the reagent disk 9 while being slid on the upper surface of the plate 129. Owing to this, during maintenance or the like, the autoloader mechanism 100 can be attached in such a manner as to be slid on the upper surface of the plate 129. Therefore, there is no need to prepare a plurality of workers for lifting and attaching the autoloader mechanism 100 on the front and back of the automatic analyzer, and it is possible to attach the relatively heavy autoloader mechanism 100 by single worker's work. This can improve work efficiency.

Furthermore, since the operating range of the reagent mounting unit 103 is within the range of the metallic plate 118, it is possible to provide the compact autoloader mechanism 100 without excessively expanding the operating range.

Moreover, since the metallic plate 118 has the opening portion 118A that is opened in the range of motion for the reagent probe 7a or 8a to access the reagent disk 9, it is possible to suppress interference between the operations of the autoloader mechanism 100 and those of the reagent dispensing mechanism 7 or 8. Owing to this, most of the operations of the autoloader mechanism 100 are not synchronized with the analysis operations and can be carried out independently. When the independent operations can be carried out, the reagent dispensing mechanisms 7 and 8 can continue the analysis operations just before the reagent bottle 10 is loaded/unloaded into/from the reagent disk 9. Therefore, an empty operation for loading the reagent bottle 10 can be reduced to a minimum and measurement can be made while the processing speed is kept.

Furthermore, the second cool box 110 includes the tubes 207A for taking in the cooling water for cooling the reagent disk 9, the cooling tank 200 in which the cooling water taken in by the tube 207A flows, and the tube 207B that discharges the cooling water flowing in the cooling tank 200. It is thereby possible to cool the second cool box without newly providing equipment necessary for cooling and achieve further saving of the mechanism installation space and further reduction of the number of constituent components.

Moreover, the cooling tank 200 of the second cool box 110 is provided on the bottom surface of the second cool box 110, and the heat exchanger plates 201 of a high thermal conductivity are provided on the surfaces other than the bottom surface of the second cool box 110. Circulation of the cooling water is necessary only on the bottom surface, so that manufacturing of the cooling tank 200 can be simplified and cold insulation of the second cool box 110 can be achieved with a simpler configuration.

Furthermore, the inner surface 200A side of the second cool box 110 is inclined with respect to the ground. Owing to this, even when the dew condensation water is generated in the second cool box 110, it is possible to make it difficult for the dew condensation water to fall toward the reagent bottle 10 and to further reduce the influence on the analysis result.

Moreover, the second cool box 110 includes the drain 206 for discharging the dew condensation water in the second cool box 110. It is thereby possible to further ensure suppression of the degradation of the reagent bottle 10 in the second cool box 110 and further reduce the influence on the analysis result.

Moreover, the second cool box 110 includes the drain 206 for discharging the dew condensation water in the second cool box 110. It is thereby possible to further ensure suppression of the degradation of the reagent bottle 10 in the second cool box 110 and further reduce the influence on the analysis result.

Furthermore, the needle cleaning tank 108 that cleans the reagent bottle lid opening mechanism 104 and the needle drying port 109 that removes the cleaning water are disposed between the reagent mounting unit 103 and the opening/closing cover 113 in parallel to the operating direction of the gripper mechanism 106. It is thereby possible to achieve further saving of the space of the autoloader mechanism 100 and clean and dry the needle 105 during movement in the horizontal direction. It is possible to further shorten work time.

Moreover, the reagent mounting unit 103 returns into the second cool box 110 before the gripper mechanism 106 starts the downward operation for loading the reagent bottle 10 into the reagent disk 9. It is thereby possible to keep the degradation of the reagent bottle 10 installed in the reagent mounting unit 103 waiting for loading into the reagent disk 9 to a minimum and further reduce the influence on the analysis result.

Second Embodiment

Figure 29:
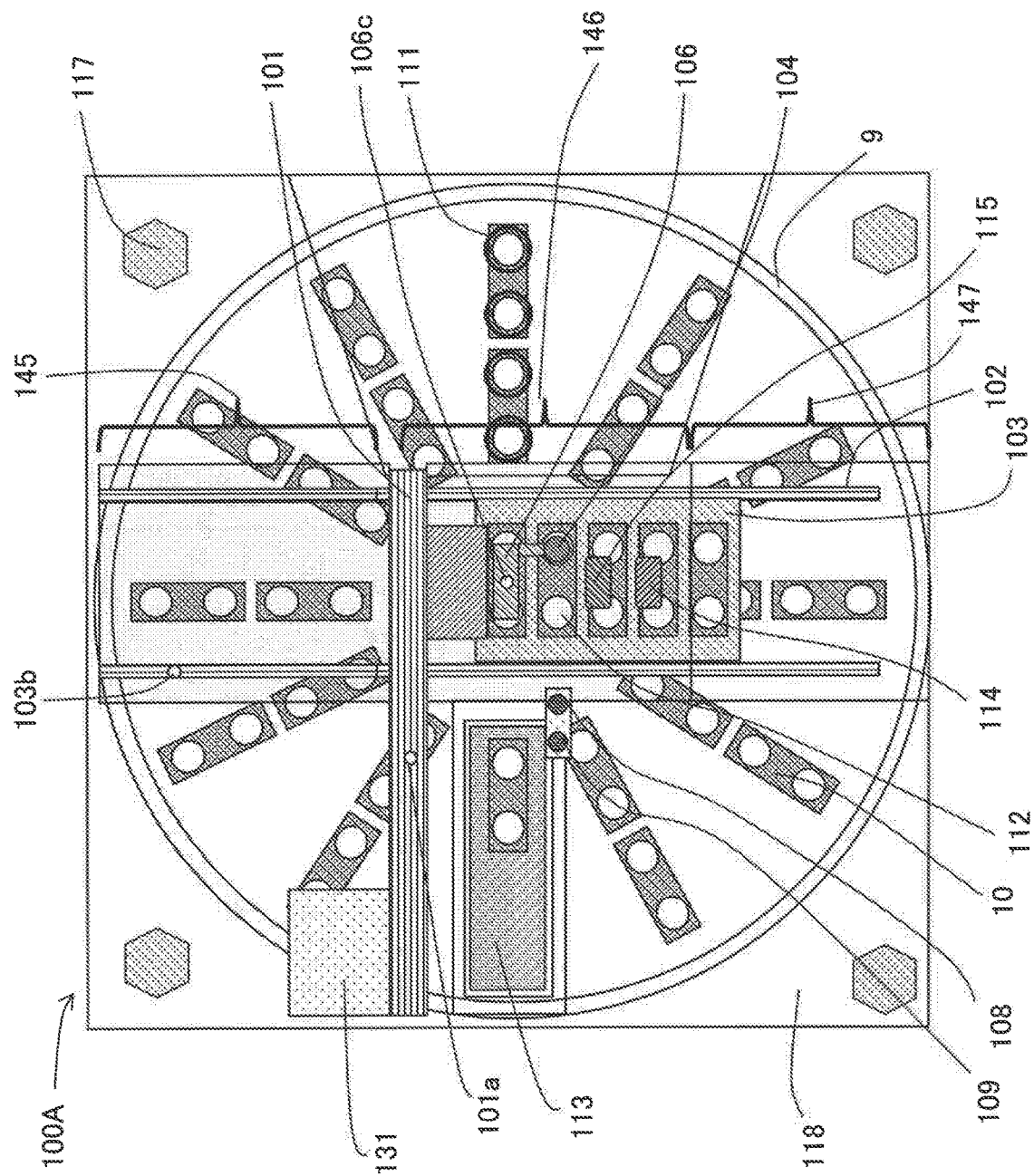
FIG. 29 is a schematic diagram explaining an example of an autoloader mechanism provided in an automatic analyzer according to a second embodiment of the present invention.

A second embodiment of the automatic analyzer and a reagent bottle loading method according to the present invention will be described with reference to FIGS. 29 and 30. Same configurations as those in the first embodiment are denoted by the same reference characters and will not be described.

While the automatic analyzer has the second cool box 110 in the first embodiment described so far, an example in which the automatic analyzer does not have the second cool box 110 will be described as the second embodiment. Since the degradation of the reagent can be prevented by exercising such control as preferentially loading the reagent bottle 10 installed in the reagent mounting unit 103 into the reagent disk 9 when the second cool box 110 is not present, it can be said that the second cool box 110 is not an essential configuration to the analyzer configuration.

An autoloader mechanism 100A according to the present embodiment is configured, as the analyzer configuration, such that the second cool box 110 is removed from the autoloader mechanism 100 shown in FIG. 2. FIG. 29 shows this configuration. The autoloader mechanism 100A is configured such that the second cool box 110 is removed, so that it is considered to remove a part corresponding to the position at which the second cool box 110 is supposed to be provided from the reagent mounting mechanism 102. However, as shown in FIG. 29, the reagent mounting mechanism 102 is present to extend up to an upper side of the reagent disk 9 shown therein.

Usefulness of the presence and extension of the reagent mounting mechanism 102 up to the upper side of the reagent disk 9 will now be described. As shown in FIG. 29, a range of the reagent mounting mechanism 102 will first be considered by being sorted into three ranges, that is, a retreat position range 145, a reagent bottle access range 146, and a reagent bottle set range 147 of the reagent mounting unit 103.

The retreat position range 145 is a range in which the abovementioned reagent mounting mechanism 102 is present to extend up to the upper side of the reagent disk 9. The retreat position range 145 is also the home position of the reagent mounting unit 103 and is a range in which the reagent mounting unit 103 retreats to a position at which at least the gripper mechanism 106 and the reagent bottle 10 mounted in the reagent mounting unit 103 do not contact each other.

Furthermore, the reagent bottle access range 146 is a range for measuring RFID information about the reagent bottle 10 and the direction of the reagent bottle 10, and is also a range in which a hole is bored in the lid of the reagent bottle 10 and the gripper mechanism 106 and the like access the reagent bottle 10. This reagent bottle access range 146 is the range of the reagent mounting unit 103 in which at least the gripper mechanism 106 and the reagent bottle 10 mounted in the reagent mounting unit 103 contact each other.

Moreover, the reagent bottle set range 147 is a range in which the operator can access the reagent mounting unit 103 for installing the reagent bottle 10. Needless to say, the reagent bottle set range 147 is a position at which the gripper mechanism 106 and the reagent bottle 10 mounted into he reagent mounting unit 103 do not contact each other.

Next, providing the retreat position range 145 is useful particularly for a reset operation for accurate positioning of each mechanism. This reset operation will be described with reference to FIG. 30. The reset operation is an operation for recovering an apparatus into a normal state when the apparatus was not correctly stopped due to power outage or the like.

Figure 30:
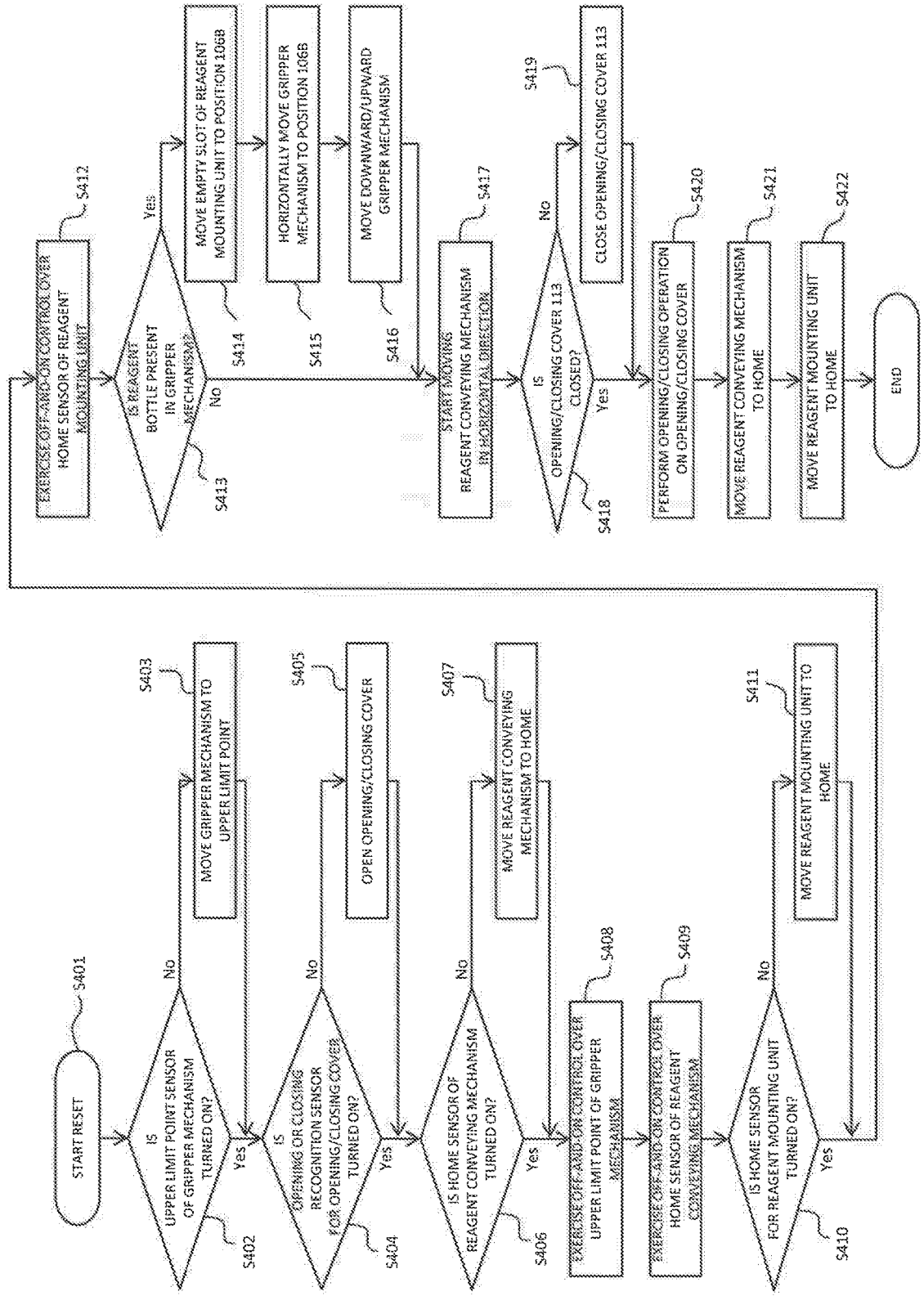
FIG. 30 is a control flowchart of each mechanism in a reset operation of the autoloader mechanism provided in the automatic analyzer according to the second embodiment of the present invention.

FIG. 30 shows a control flow of each mechanism in the reset operation. The controller 21 exercises control over an operation of each mechanism.

In FIG. 30, a reset operation is started (Step S401).

Next, it is determined whether an upper limit point sensor 106c (see FIG. 29, third sensor) of the gripper mechanism 106 is turned on (Step S402). It is noted that the upper limit point sensor 106c is a sensor that detects whether the gripper mechanism 106 is at the upper limit point.

When it is determined that the upper limit point sensor 106c is not turned on (No), the gripper mechanism 106 is not at the upper limit point and the controller 21 exercises control to move the gripper mechanism 106 to the upper limit point (Step S403). It is noted that the upper limit point used herein may not always be an uppermost position but refers to a home position. For the upper limit point to serve as the home position of the gripper mechanism 106, the upper limit point may have a height at which the reagent bottle 10 does not contact the gripper mechanism 106 even if the reagent mounting unit 103 is moved in a state in which the reagent bottle 10 is mounted in the reagent mounting unit 103. In other words, when the gripper mechanism 106 is at the upper limit point (home position), the reagent mounting unit 103 can operate longitudinally without contact of the reagent bottle 10 mounted in the reagent mounting unit 103 with the gripper mechanism 106. On the other hand, when it is determined that the upper limit point sensor 106c is turned on (Yes), the analyzer proceeds to Step S404.

Next, it is determined whether the opening recognition sensor 301 or the closing recognition sensor 302 for the opening/closing cover 113 is turned on (Step S404). When it is determined that neither the opening recognition sensor 301 nor the closing recognition sensor 302 is turned on (No), then it is determined that the opening/closing cover 113 is in neither a fully opened state nor a fully closed state, and the controller 21 exercises control to fully open the opening/closing cover 113 (Step S405). When it is determined that the opening recognition sensor 301 or the closing recognition sensor 302 is turned on (Yes), the analyzer proceeds to Step S406. As a result of determinations of Steps S404 and S405, the opening/closing cover 113 is in either the fully opened state or the fully closed state.

Next, it is determined whether a home sensor 101a (see FIG. 29, first sensor) for the reagent conveying mechanism 101 is turned on (Step S406). When it is determined that the home sensor 101a is not turned on (No), the controller 21 exercises control to move the reagent conveying mechanism 101 to the home position (Step S407). Here, the home position of the reagent conveying mechanism 101 is closer to the opening/closing cover 113, and the home sensor 101a is a sensor that confirms whether the reagent conveying mechanism 101 is present at this home position. The reason for setting the home position closer to the opening/closing cover 113 will be described later. On the other hand, when it is determined that the home sensor 101a is turned on (Yes), the process proceeds to Step S408.

Next, the controller 21 exercises off-and-on control over the upper limit point of the gripper mechanism 106 (Step S408). The off-and-on control is control for accurate positioning. Specifically, the gripper mechanism 106 is moved once to a position at which the upper limit point sensor 106c is turned off in a perpendicular direction, and moved and stopped again to/at an exact position at which the upper limit point sensor 106c is turned on. This operation enables the automatic analyzer to grasp that this mechanism is set on standby at the accurate position. It is noted that this off-and-on control does not cause a collision between the reagent mounting mechanism 102 itself or the reagent bottle 10 mounted in this mechanism and the gripper mechanism 106 since the gripper mechanism 106 is already present at the position that is closer to the opening/closing cover 113 and that is the home position of the reagent conveying mechanism 101.

Subsequently, the controller 21 exercises off-and-on control over the home sensor 101a of the reagent conveying mechanism 101 (Step S409). Under this control, similarly to the above control, the reagent conveying mechanism 101 is moved once to a position at which the home sensor 101a is turned off in the horizontal direction, and moved and stopped again to/at an exact position at which the home sensor 101a is turned on. This enables the automatic analyzer to grasp that this mechanism is set on standby at the accurate position.

Next, it is determined whether a home sensor 103 b (see FIG. 29, second sensor) for the reagent mounting unit 103 is turned on (Step S410). When it is determined that the home sensor 103 b is not turned on (No), the controller 21 exercises control to move the reagent mounting unit 103 to the home position (Step S411). Here, the home position of the reagent mounting unit 103 is within the aforementioned retreat position range 145, and the home sensor 103b is a sensor that confirms whether the reagent mounting unit 103 is present at this home position. It is noted that the movement of the reagent mounting unit 103 to the retreat position range does not cause a collision between the reagent bottle 10 mounted in the reagent mounting unit 103 and the gripper mechanism 106 since the reagent conveying mechanism 101 is already present closer to the opening/closing cover 113. On the other hand, when it is determined that the home sensor 103b is turned on (Yes), the process proceeds to Step S412.

Next, the controller 21 exercises off-and-on control over the home sensor 103b of the reagent mounting unit 103 (Step S412). Under this control, similarly to the above control, the reagent mounting unit 103 is moved once to a position at which the home sensor 103b is turned off along the reagent mounting mechanism 102, and moved and stopped again to/at an exact position at which the home sensor 103b is turned on along the reagent mounting mechanism 102. This enables the automatic analyzer to grasp that this mechanism is set on standby at the accurate position. At this timing, it is confirmed whether the reagent bottle 10 is installed in each reagent slot of the reagent mounting unit 103.

Through the flow described so far, the gripper mechanism 106, the reagent conveying mechanism 101, and the reagent mounting unit 103 can be each moved to the home position and the automatic analyzer can grasp the exact positions of these.

Next, when the reagent bottle 10 is present in the gripper mechanism 106 just before the reset operation is carried out, it is necessary to move the reagent bottle 10 to the reagent mounting unit 103 and then complete the reset operation. The controller 21, therefore, exercises control as follows.

First, it is determined whether the reagent bottle 10 is present in the gripper mechanism 106 (Step S413). Whether the reagent bottle 10 is present is confirmed by a reagent bottle presence/absence confirmation sensor 303. When it is determined that the reagent bottle 10 is present (Yes), an empty slot of the reagent mounting unit 103 is moved first to the position 106B shown in FIG. 6 to receive this reagent bottle 10 (Step S414). Next, the gripper mechanism 106 is horizontally moved to a portion right above the position 106B (Step S415). Finally, the gripper mechanism 106 is moved downward and upward (Step S416). This operation moves the reagent bottle 10 in the gripper mechanism 106 onto the reagent mounting unit 103. On the other hand, when it is determined that the reagent bottle 10 is not present (No), the analyzer proceeds to Step S417.

Next, the controller 21 exercises control to start moving the reagent conveying mechanism 101 in the horizontal direction is started (Step S417). When movement of the reagent bottle 10 is over, the controller 21 exercises control to start moving the reagent conveying mechanism 101 to the home position. On the other hand, even when the reagent bottle 10 is not present in the gripper mechanism 106, that is, even when a determination result of Step S413 is No, the controller 21 exercises control to start moving the reagent conveying mechanism 101 in the horizontal direction. The operation of moving the gripper mechanism 106 toward the reagent mounting unit 103 in the present step is an operation for avoiding contact between an operation of the opening/closing cover 113 to be carried out next and the gripper mechanism 106. However, when a position relationship (position relationship like the position A shown in FIGS. 27 and 28) is held between the opening/closing cover 113 and the gripper mechanism 106, the operation in the present step can be omitted.

It is then determined whether the opening/closing cover 113 is closed (Step S418). As a result of Steps S404 and S405, the opening/closing cover 113 is either opened or closed. Therefore, when a determination result of Step S418 is No, this indicates that the opening/closing cover 113 is opened. In this case, the opening/closing cover 113 is closed (Step S419). On the other hand, when the determination result is Yes, the analyzer proceeds to Step S420.

Next, an opening/closing operation is performed on the opening/closing cover 113 (Step S420). It is assumed herein that after the opening/closing cover 113 is fully opened to cause the opening recognition sensor 301 to detect that the opening/closing cover 113 is opened, then the opening/closing cover 113 is fully closed to cause the closing recognition sensor 302 to detect that the opening/closing cover 113 is closed. It is thereby confirmed that the opening recognition sensor 301 and the closing recognition sensor 302 function normally. When a position relationship between the opening/closing cover 113 and the gripper mechanism 106 is such that the opening/closing cover 113 contacts the gripper mechanism 106, Step S420 is completed before movement of the reagent conveying mechanism 101 to the home position is over on the basis of start of movement in Step S417.

Next, the controller 21 exercises control to move the reagent conveying mechanism 101 to the home position (Step S421). When the reagent conveying mechanism 101 is moving toward the home position in Step S417, the movement thereof to the home position is completed at this timing of Step S421. On the other hand, when the gripper mechanism 106 performs an avoidance operation in Step S417, then the reagent conveying mechanism 101 is moved to return to the home position over again to complete the movement. The controller 21 exercises control to move the reagent mounting unit 103 to the home position and the movement of the reagent mounting unit 103 into the above-mentioned retreat position range 145 is completed (Step S422).

By adopting such a flow, the reagent bottle 10 can be recovered into the reagent mounting unit 103 and kept in the retreat position range 145 without contact of the reagent bottle 10 with the other mechanism even in the reset operation in response to the case in which the gripper mechanism 106 has the reagent bottle 10.

While the flow is described in detail with reference to FIG. 30, an order of movement is important. That is, particularly after the gripper mechanism 106 is set into a state of being located at the upper limit point (home position) in the reset operation, the reagent conveying mechanism 101 is moved to the home position and the reagent mounting unit 103 is then moved to the home position. This order makes it possible to complete the reset operation without contact of the reagent bottle 10 or any of the various mechanisms with the other object.

It is noted that the home position of the gripper mechanism 106 is a position at which a height relationship is held such that an upper end of the reagent bottle 10 and a lower end of the gripper mechanism 106 do not overlap each other in the horizontal direction in a state in which the reagent bottle 10 is mounted at least in the reagent mounting unit 103.

Furthermore, the home position of the reagent conveying mechanism 101 is a position at which the reagent bottles 10 do not contact each other when at least the gripper mechanism 106 has the reagent bottle 10 and the reagent mounting unit (tray) 103 moves in the vertical direction in FIG. 2 in a state in which the reagent bottle 10 is mounted in the reagent mounting unit 103. While it is described that the home position of the reagent conveying mechanism 101 is present closer to the opening/closing cover 113, the home position may be any position at which the reagent bottles 10 do not contact each other and is not always present right above the opening/closing cover 113. By setting the home position of the reagent conveying mechanism 101 to such a position, the reagent mounting unit 103 can be returned to the home position without contact between the reagent bottles 10 even if the reagent bottles 10 are present in both the reagent mounting unit 103 and the gripper mechanism 106. Therefore, it is possible to provide the home position of the gripper mechanism 106 to be relatively close to the reagent mounting unit 103 without excessively locating the home position thereof above, move the reagent bottle 10 in the vertical direction in short time, and eventually achieve miniaturization of the automatic analyzer itself.

For example, if the automatic analyzer is stopped at a moment at which the gripper mechanism 106 grips the reagent bottle 10 in the middle of the reagent mounting unit 103, and the reagent mounting unit 103 is returned to the home position before the gripper mechanism 106 is returned to the home position, the gripper mechanism 106 or the reagent bottle 10 gripped by the gripper mechanism 106 contacts the reagent bottle 10 mounted in the reagent mounting unit 103 downward of the middle of the reagent mounting unit 103. Furthermore, if the reagent mounting mechanism 101 is returned to the home position before the gripper mechanism 106 is returned to the home position, the reagent bottle 10 is possibly caught in an edge of the reagent mounting unit 103 (see FIG. 9). This is why it is desirable in the reset operation to use the order of movement, that is, to move the gripper mechanism 106 to the home position, to move the reagent conveying mechanism 101 to the home position, and to move the reagent mounting unit 103 to the home positions.

Moreover, as shown in the flow of FIG. 30, it is desirable to move the reagent conveying mechanism 101 to the home position (Step S407) before the controller 21 exercises off-and-on control over the home position of the gripper mechanism 106 (Step S408). As described above, when the home position of the gripper mechanism 106 is provided at the position relatively close to the reagent mounting unit 103, the lower end of the reagent bottle 10 gripped by the gripper mechanism 106 is often below the upper end of the reagent bottle 10 mounted in the reagent mounting unit 103 while the gripper mechanism 106 grips the reagent bottle 10 even in a state in which the gripper mechanism 106 is at the home position. The reason is as follows. If the off-and-on control is exercised over the home position of the gripper mechanism 106 in a state in which the reagent conveying mechanism 101 is not moved to the home position but is present above the reagent mounting unit 103 in this case, the reagent bottle 10 gripped by the gripper mechanism 106 possibly contacts the other object.

Furthermore, the home position of the reagent mounting unit 103 is within the retreat position range 145. It is thereby possible to avoid contact between the reagent bottle 10 mounted in the reagent mounting unit 103 and the gripper mechanism 106 or the reagent bottle 10 gripped by the gripper mechanism 106 in a state in which the reagent mounting unit 103 returns to the home position.

Furthermore, the reagent bottle set range 147, the reagent bottle access range 146, and the retreat position range 145 are allocated in this order from an analyzer forward side (on which the operator installs the reagent bottle 10 in the reagent mounting unit 103). It is thereby possible to complete the reset operation without moving the reagent mounting unit 103 to the reagent bottle set range 147.

As for the flow, the mechanisms or units may be often controlled simultaneously as long as there is no probability of contact with other mechanisms. Moreover, the reset operation flow of FIG. 30 is applicable to the case of the first embodiment in which the second cool box 110 is provided, in accordance with a similar concept.

Other configurations and operations of the automatic analyzer and the reagent bottle loading method according to the present embodiment are generally same as those according to the first embodiment described above and will not be described in detail.

The automatic analyzer and the reagent bottle loading method according to the second embodiment of the present invention can attain generally similar advantages as those according to the first embodiment described above.

Moreover, providing the reagent mounting mechanism 102 the horizontal position of which is between the reagent probe suction port 111 and the opening/closing cover 113 and which moves the reagent mounting unit 103 between the installation position at which the operator installs the reagent bottle 10 in the reagent mounting unit 103 and the position 106B at which the gripper mechanism 106 grips the reagent bottle 10 even if the second cool box 110 is not provided enables the autoloader mechanism 100 to be disposed so that the operating range thereof concentrates above the reagent disk 9 and the installation area of the autoloader mechanism 100 to fall within the automatic analyzer. Owing to this, a function of automatically installing the reagent bottles 10 in the reagent disk 9 can be installed without changing a gross floor area from that of a conventional analyzer configuration.

Furthermore, the gripper mechanism 106, the reagent conveying mechanism 101, and the reagent mounting unit 103 each have the home position, and in the reset operation, the gripper mechanism 106, the reagent conveying mechanism 101, and the reagent mounting unit 103 are controlled to be returned to the home positions in this order. It is thereby possible to carry out the reset operation without contact between the reagent bottle 10 held by the gripper mechanism 106 and the reagent bottle 10 mounted in the reagent mounting unit 103 even in a state in which the gripper mechanism 106 holds the reagent bottle 10.

Moreover, the automatic analyzer includes the home sensor 101a that is disposed at the home position of the reagent conveying mechanism 101 and that detects the reagent conveying mechanism 101, and the home sensor 103b that is disposed at the home position of the reagent mounting unit 103 and that detects the reagent mounting unit 103. The home sensor 101a is disposed at the position at which the reagent bottle 10 held by the reagent conveying mechanism 101 does not contact the reagent bottle 10 held by the reagent mounting unit 103 even when the reagent mounting unit 103 moves longitudinally in a state in which the home sensor 101a detects the reagent conveying mechanism 101, and the home sensor 103b is disposed at the position at which the reagent bottle 10 held by the reagent mounting unit 103 does not contact the reagent bottle 10 held by the gripper mechanism 106 even when the gripper mechanism 106 moves vertically in a state in which the reagent bottle 10 is installed in the reagent mounting unit 103. It is thereby possible to appropriately realize the reset operation.

Furthermore, the automatic analyzer includes the upper limit point sensor 106c that is disposed at the home position of the gripper mechanism 106 and that detects the gripper mechanism 106. The upper limit point sensor 106c is disposed at the position at which the reagent bottle 10 held by the reagent mounting unit 103 does not contact the gripper mechanism 106 when the reagent mounting unit 103 holding the reagent bottle 10 moves longitudinally in a state in which the upper limit point sensor 103 detects the gripper mechanism 106 and when the gripper mechanism 106 does not hold the reagent bottle 10, and at which the reagent bottle 10 held by the gripper mechanism 106 contacts the reagent bottle 10 held by the reagent mounting unit 103 when the reagent mounting unit 103 holding the reagent bottle 10 moves longitudinally in the state in which the upper limit point sensor 106c detects the gripper mechanism 106 and when the gripper mechanism 106 holds the reagent bottle 10. Therefore, it is possible to provide the home position of the gripper unit to be relatively close to the reagent conveying unit without excessively locating the home position thereof above. Owing to this, it is possible to move the reagent bottle 10 in the vertical direction in short time, and eventually achieve miniaturization of the automatic analyzer itself.

Moreover, the reagent mounting mechanism 102 is sorted into the reagent bottle set range 147 in which the operator sets the reagent bottle 10, the reagent bottle access range 146 in which the gripper mechanism 106 accesses the reagent bottle 10, and the retreat position range 145 in which the gripper mechanism 106 does not contact the reagent bottle 10 in order from the forward side, with a position at which the operator sets the reagent bottle 10 assumed as a reference, and the home sensor 103b detects the reagent mounting unit 103 in the retreat position range 145. It is thereby possible to complete the reset operation without moving the reagent mounting unit 103 to the reagent bottle set range 147 during, for example, the reset operation.

<Others>

The present invention is not limited to the embodiments described above and various modifications and applications can be made. The abovementioned embodiments have been described in detail for describing the present invention so that the present invention is easy to understand. The present invention is not always limited to the embodiments having all the configurations described so far.

For example, while the example of the automatic analyzer that makes an incision in the lid 112 of each reagent bottle 10 by the analyzer side has been shown, the automatic analyzer is not limited to such an analyzer. The present invention is also applicable to an automatic analyzer into which the reagent bottle 10 opened not by the analyzer side but by the operator is loaded.

Furthermore, when the reagent bottles 10 are installed in all the reagent slots of the reagent mounting unit 103, the reagent bottle 10 installed in the reagent disk 9 becomes empty, and the empty reagent bottle 10 is to be disposed of to outside of the automatic analyzer, then one or a few empty reagent slots are provided in the reagent slots that can be installed in the reagent disk 9. Upon providing the empty reagent slots, the reagent bottles 10 installed in the reagent mounting unit 103 are loaded into the reagent disk 9 without making an incision in the lid 112 of each reagent bottle 10, and the empty reagent bottle 10 is gripped by the gripper mechanism 106, carried on the reagent mounting unit 103, and then unloaded by the operator. After unloading, it is possible to return the reagent bottle 10 that is installed in the reagent disk 9 and that is not incised to the empty reagent slot again. A similar operation can be carried out by providing one or a few empty reagent slots in the reagent mounting unit 103.

Moreover, the gripper mechanism 106, the opening/closing cover 113 of the reagent disk 9, and the reagent probe suction port 111 are disposed linearly in the embodiments. However, a form of disposing the reagent probe suction port 111 is not limited to the linear form if the reagent probe suction port 111 is disposed in a range in which the reagent probe 7a or 8a can operate.

Furthermore, the embodiments have been described while the number of needles 105 is assumed as one. Alternatively, when two caps 112 are provided in each reagent bottle 10, then two needles 105 are attached at intervals of holes in the caps 112 of the reagent bottle 10, the holes are simultaneously bored in the two caps 112 by the downward operation of the reagent bottle lid opening mechanism 104 in the first operation. Furthermore, two needle cleaning tanks 108 and two needle drying ports 109 are disposed at the intervals of the needles 105. It is thereby possible to clean and dry each needle by one vertical operation and, therefore, shorten loading time.

While the bottle orientation detecting sensor 114 and the RFID sensor 115 disposed above the reagent mounting mechanism 102 are described in the embodiments, the bottle orientation detecting sensor 114 and the RFID sensor 115 may be disposed laterally or downward.

Furthermore, while an example of the reagent mounting mechanism 102 using the linear guide and the rails is described as the conveying line in the embodiments, the reagent mounting unit 103 may be moved by the linear guide without using the rails in such a manner as a monorail. Alternatively, another example may be applied as long as the reagent mounting unit 103 can be moved in the longitudinal direction. Nevertheless, it is possible to the stable reagent mounting unit 103 by using the linear guide and the rails.

DESCRIPTION OF REFERENCE CHARACTERS

1: Reaction disk
2: Reaction container
3: Cleaning mechanism
4: Spectrophotometer
4a: Light source
5, 6: Stirring mechanism
7, 8: Reagent dispensing mechanism
7a, 8a: Reagent probe
9: Reagent disk
9A: Rotation center
10: Reagent bottle
10a: RFID tag
11: Sample dispensing mechanism
11a: Sample probe
13: Cleaning tank
15: Sample container
16: Rack
17: Sample conveying mechanism
18: Reagent syringe
19: Sample syringe
20: Cleaning pump
21: Controller
30, 31: Cleaning tank for stirring mechanism
32: Cleaning tank for sample dispensing mechanism
33: Cleaning tank for reagent dispensing mechanism
100, 100A: Autoloader mechanism
101: Reagent conveying mechanism (reagent conveying unit)
101a: Home sensor (first sensor)
102: Reagent mounting mechanism (conveying line)
103: Reagent mounting unit (tray)
103a: Wall
103b: Home sensor (second sensor)
104: Reagent bottle lid opening mechanism
105: Needle
106: Gripper mechanism (gripper unit)
106A: operating direction of gripper mechanism
106B: Position of intersecting point between gripper mechanism and linear guide
106c: Upper limit point sensor (third sensor)
108: Needle cleaning tank
109: Needle drying port
110: Second cool box (reagent cool box)
111: Reagent probe suction port
112: Cap
113: Opening/closing cover (loading port)
114: Detection sensor
115: RFID sensor
116: Cover
116A: Sidewall
117: Strut
118: Metallic plate
118A, 118B: Opening portion
119: Linear guide
119A: Installation direction of linear guide
121: Tire
122: First holding unit
123: First rail
124: Second rail
125: Second cool box inner conveying surface
126, 126B, 126C: Gap
127, 127A: Auxiliary rail
129: Plate
130: Vertical drive motor
131: Horizontal drive motor
132: Reagent mounting mechanism motor
141: Reagent mounting mechanism belt
142: First pulley
143: Second pulley
145: Retreat position range
146: Reagent bottle access range
147: Reagent bottle set range
150: Reagent conveying belt
151: Third pulley
152: Fourth pulley
153: Second holding unit
200: Cooling tank
200A: Surface
200B: Upper surface
201: Heat exchanger plate
202: Heat insulating material
203: First door
203A: Tip end position (longest distance arrival point)
204: Second door
204A: Tip end position (longest distance arrival point)
205: Third door
205A: Tip end position (longest distance arrival point)
206: Drain
207A: Tube (intake pipe)
207B: Tube (exhaust pipe)
208: Single door
209, 210: Door
301: Opening recognition sensor
302: Closing recognition sensor
303: Reagent bottle presence/absence confirmation sensor

The invention claimed is:

1. An automatic analyzer configured to dispense a sample and a reagent to a reaction container to react the sample and the reagent, the automatic analyzer configured to measure a liquid that has reacted, the automatic analyzer comprising:

a reagent disk, having a cover, configured to store a reagent bottle containing the reagent, the reagent disk including a reagent probe suction port, in the cover, accessed by a reagent probe when the reagent is dispensed in the reaction container and a loading port, in the cover, through which the reagent bottle is loaded into the reagent disk;

a reagent mounting unit disposed above the reagent disk configured to be provided with one or more reagent bottles, which are installed when the one or more reagent bottles are loaded into the automatic analyzer;

a reagent conveying unit, disposed above the reagent disk, including a gripper unit configured to grip and convey a respective reagent bottle installed in the reagent mounting unit into the reagent disk; and a linear guide disposed above the reagent disk, supporting the reagent mounting unit loaded with the installed one or more reagent bottles for movement along the linear guide, the linear guide being disposed between the reagent probe suction port and the loading port in a plan view and extending to an installation position at which the one or more reagent bottles are installed in the reagent mounting unit and extending to a position at which the gripper unit grips the respective reagent bottle.

2. The automatic analyzer according to claim 1, further comprising:

a reagent cooling box configured to cool the one or more reagent bottles installed in the reagent mounting unit along with the reagent mounting unit, wherein the linear guide extends to the reagent cooling box.

3. The automatic analyzer according to claim 1, wherein an operating direction in which the gripper unit conveys a respective reagent bottle to the loading port is orthogonal to a direction of the linear guide in the plan view, and wherein the position at which the gripper unit grips the respective reagent bottle installed in the reagent mounting unit is an intersection of the linear guide and the operation direction in which the gripper unit coveys the respective reagent bottle to the loading port in the plan view.

4. The automatic analyzer according to claim 1, wherein the reagent linear guide is disposed such that the gripper unit passes through a rotation center of the reagent disk.

5. The automatic analyzer according to claim 1, further comprising:

a first rail disposed on a side, which is closer to the loading port, of the linear guide in parallel to the linear guide; and a second rail disposed on a side, which is closer to the reagent probe suction port, of the linear guide in parallel to the linear guide and the first rail, and wherein the reagent mounting unit is conveyed on the linear guide, the first rail, and the second rail.

6. The automatic analyzer according to claim 5, further comprising:

a reagent cooling box configured to cool the one or more reagent bottles installed in the reagent mounting unit along with the reagent mounting unit, wherein the linear guide extends to the reagent cooling box, wherein a first gap is present between the first rail and a conveying surface of the reagent mounting unit of the reagent cooling box, and wherein a second gap is present between the second rail and the conveying surface.

7. The automatic analyzer according to claim 1, wherein an operation from installation of the reagent bottle in the reagent mounting unit to opening of the reagent bottle is asynchronous with respect to an analysis operation.

8. The automatic analyzer according to claim 1, wherein the reagent mounting unit, the reagent conveying unit, and the linear guide are disposed on a metallic plate provided on the reagent disk.

9. The automatic analyzer according to claim 8, wherein the metallic plate is disposed on the reagent disk and is supported by a strut disposed on an outer circumference of the reagent disk.

10. The automatic analyzer according to claim 8, wherein a plate is provided between the metallic plate and the reagent disk, and wherein the metallic plate is disposed on the reagent disk and is slidable on an upper surface of the plate.

11. The automatic analyzer according to claim 8, wherein an operating range of the reagent mounting unit is within a range of the metallic plate.

12. The automatic analyzer according to claim 8, wherein the metallic plate includes an opening having a size of a movable range for a reagent probe to access the reagent disk.

13. The automatic analyzer according to claim 1, wherein the reagent conveying unit further includes a lid opening unit configured to open a lid of the reagent bottle, and wherein a cleaning tank configured to clean the lid opening unit and a drying port configured to remove cleaning water after cleaning in the cleaning tank are disposed between the reagent mounting unit and the loading port in parallel to an operating direction of the gripper unit.

14. The automatic analyzer according to claim 1, wherein the gripper unit, the reagent conveying unit, and the reagent mounting unit each have a home position, and in a reset operation, the gripper unit, the reagent conveying unit, and the reagent mounting unit are controlled to be returned to the respective home positions in this order.

15. The automatic analyzer according to claim 14, further comprising:

a first sensor that is disposed at the home position of the reagent conveying unit and configured to detect the reagent conveying unit; and a second sensor that is disposed at the home position of the reagent mounting unit and configured to detect the reagent mounting unit, wherein the first sensor is disposed at a position at which the reagent bottle held by the reagent conveying unit and the reagent bottle held by the reagent mounting unit do not contact with each other even when the reagent mounting unit moves longitudinally in a state in which the first sensor detects the reagent conveying unit, and the second sensor is disposed at a position at which the reagent bottle held by the reagent mounting unit and the reagent bottle held by the gripper unit contact with each other even when the gripper unit moves vertically in a state in which the reagent bottle is installed in the reagent mounting unit.

16. The automatic analyzer according to claim 15, further comprising:

a third sensor that is disposed at the home position of the gripper unit and configured to detect the gripper unit, wherein the third sensor is disposed at a position such that in a condition in which the reagent mounting unit holding the reagent bottle moves longitudinally while the gripper unit being detected, when the gripper unit does not hold the reagent bottle, the reagent bottle held by the reagent mounting unit and the gripper unit do not contact with each other, and when the gripper unit holds the reagent bottle, the reagent bottle held by the reagent mounting unit and the reagent bottle held by the gripper unit contact with each other.

17. The automatic analyzer according to claim 15, wherein the linear guide has a reagent bottle set range in which the operator sets the reagent bottle, a range in which the gripper unit accesses the reagent bottle, and a retreat position range in which the gripper unit does not contact the reagent bottle in order from a forward side, with a position at which the operator sets the reagent bottle assumed as a reference, and the second sensor detects the reagent mounting unit in the retreat position range.

18. A method of loading a reagent bottle into an automatic analyzer configured to dispense a sample and a reagent to each of a plurality of reaction containers to react the sample and the reagent, the automatic analyzer configured to measure a liquid that has reacted, the automatic analyzer comprising: a reagent disk, having a cover, that stores the reagent bottle containing the reagent, the reagent disk including a reagent probe suction port, in the cover, accessed by a reagent probe when the reagent is dispensed in the reaction container and a loading port, in the cover, through which the reagent bottle is loaded into the reagent disk; a reagent mounting unit, disposed above the reagent disk, in which a plurality of reagent bottles are installed when the reagent bottle is loaded into the automatic analyzer; a reagent cooling box that includes an opening/closing door for entry and exit of the reagent mounting unit, and that cools the reagent bottle installed in the reagent mounting unit along with the reagent mounting unit; a reagent conveying unit, disposed above the reagent disk, including a gripper unit configured to grip the reagent bottle for conveying the reagent bottle installed in the reagent mounting unit into the reagent disk; and a linear guide disposed above the reagent disk, supporting the reagent mounting unit loaded with the installed one or more reagent bottles, the reagent mounting unit configured for movement along the linear guide, the linear guide being disposed between the reagent probe suction port and the loading port in a plan view and extending to an installation position at which the reagent bottles are installed in the reagent mounting unit and extending to a position at which the gripper unit grips the respective reagent bottle, the method comprising:

a moving step of causing the reagent mounting unit in which the reagent bottles to be loaded are installed to exit out of the reagent cooling box, and to be stopped at a position at which the gripper unit grips the respective reagent bottles;

a gripping step of causing the gripper unit to grip the respective reagent bottles; and a loading step of causing the gripper unit to move to a position of the loading port and to load the respective reagent bottles into the reagent disk, wherein the opening/closing door of the reagent cooling box remains open during the moving step and the gripping step.

19. The method of loading a reagent bottle according to claim 18, wherein the reagent mounting unit returns into the reagent cooling box during the loading step.

20. The automatic analyzer according to claim 1, further comprising: a motor driving a belt connected to the reagent mounting unit, wherein the reagent mounting unit is conveyed on the linear guide by the belt which is driven by the motor.

21. The method of loading a reagent bottle according to claim 18, further comprising:

a motor driving a belt connected to the reagent mounting unit, wherein the reagent mounting unit is conveyed on the linear guide by the belt which is driven by the motor.

* * * * *